US010942705B2

(12) United States Patent
Tanamoto et al.

(10) Patent No.: US 10,942,705 B2
(45) Date of Patent: Mar. 9, 2021

(54) QUANTUM ANNEALING APPARATUS

(71) Applicants: KABUSHIKI KAISHA TOSHIBA, Minato-ku (JP); TOSHIBA MEMORY CORPORATION, Minato-ku (JP)

(72) Inventors: Tetsufumi Tanamoto, Kawasaki (JP); Yoshifumi Nishi, Yokohama (JP); Jun Deguchi, Kawasaki (JP)

(73) Assignees: KABUSHIKI KAISHA TOSHIBA, Minato-ku (JP); TOSHIBA MEMORY CORPORATION, Minato-ku (JP)

(*) Notice: Subject to any disclaimer, the term of this patent is extended or adjusted under 35 U.S.C. 154(b) by 195 days.

(21) Appl. No.: 16/289,098

(22) Filed: Feb. 28, 2019

(65) Prior Publication Data
US 2020/0089470 A1 Mar. 19, 2020

(30) Foreign Application Priority Data
Sep. 18, 2018 (JP) .............................. JP2018-173388

(51) Int. Cl.
G06F 7/22 (2006.01)
G06N 10/00 (2019.01)
(52) U.S. Cl.
CPC .............. *G06F 7/22* (2013.01); *G06N 10/00* (2019.01)
(58) Field of Classification Search
None
See application file for complete search history.

(56) References Cited

U.S. PATENT DOCUMENTS

| 8,190,548 | B2 | 5/2012 | Choi |
| 10,482,388 | B1* | 11/2019 | Jock ................. H01L 29/66977 |
| 2003/0055513 | A1* | 3/2003 | Raussendorf .......... G06N 10/00 700/1 |
| 2003/0058697 | A1 | 3/2003 | Tour et al. |

(Continued)

FOREIGN PATENT DOCUMENTS

JP 2018-163495 10/2018

OTHER PUBLICATIONS

Wolfgang Lechner, et al. "A quantum annealing architecture with all-to-all connectivity from local interactions", Science Advances vol. 1, No. 9, e1500838, (2015), 6 pages.

(Continued)

*Primary Examiner* — Michael D. Yaary
(74) *Attorney, Agent, or Firm* — Oblon, McClelland, Maier & Neustadt, L.L.P.

(57) ABSTRACT

According to an embodiment, a quantum annealing apparatus includes: an output unit acquiring and outputting components in a Z axis from a plurality of quantum bits in a quantum calculation; and an operation unit executes: a selecting process of selecting a first quantum bit, a second quantum bit and a third quantum bit, the second quantum bit and the third quantum bit being coupled in the quantum calculation unit; a first rotating operation of rotating each of the second quantum bit and the third quantum bit by 90° around a first axis perpendicular to the Z axis; an interaction operation of causing the first quantum bit and the second quantum bit to interact with each other; and a second rotating operation of rotating each of the second quantum bit and the third quantum bit by 90° around a second axis perpendicular to the Z axis and the first axis.

15 Claims, 29 Drawing Sheets

(56) References Cited

U.S. PATENT DOCUMENTS

2004/0078421 A1* 4/2004 Routt .................... H04L 9/0852
709/201
2016/0300155 A1* 10/2016 Betz ..................... H01L 39/025
2018/0276557 A1 9/2018 Tanamoto et al.

OTHER PUBLICATIONS

Vicky Choi, "Minor-embedding in adiabatic quantum computation:II. Minor-universal graph design", Quantum Information Processing, vol. 10, Issue 3, (2011), 10 pages.
Vicky Choi, "Minor-Embedding in Adiabatic Quantum Computation: I. The Parameter Setting Problem", Quantum Information Processing, 7, (2008), 18 pages.
T. Tanamoto, "Implementation of standard quantum error correction codes for solid-state qubits", Phys. Rev. A. 88 062334, (2013), 14 pages.
Antti O. Niskanen, et al., "Tunable coupling scheme for flux qubits at the optimal point", Phys. Rev. B 73, 094506, (2006), 8 pages.
Martin Leib, et al., "A transmon quantum annealer: Decomposing many-body ising constraints into pair interactions", Quantum Science and Technology 1 (1), 015008, 16 pages.
Tetsufumi Tanamoto, et al., "Calculation of a capacitively-coupled floating gate array toward quantum annealing machine", J. Appl. Phys. 124, 154301 (2018), 14 pages.

* cited by examiner

FIG.21

$H_{tgt} = Z_{a1}Z_{a2} + Z_{a2}Z_{a3} + Z_{a3}Z_{a4} + Z_{a4}Z_{a5}$
$+ Z_{b1}Z_{b2} + Z_{b2}Z_{b3} + Z_{b3}Z_{b4}$
$+ Z_{c1}Z_{c2} + Z_{c2}Z_{c3}$
$+ Z_{d1}Z_{d2}$ [start]
$\rightarrow Z_{a1}Z_{a2} + Z_{a2}Z_{a3} + Z_{a3}Z_{a4} + Z_{a4}Z_{a5}$
$+ Z_{b1}Z_{b2} + Z_{b2}Z_{b3} + Z_{b3}Z_{b4}$
$+ Z_{c1}Z_{c2} + Z_{c2}Z_{c3}$
$+ X_{d1}X_{d2}$ [step1]
$\rightarrow Z_{a1}Z_{a2} + Z_{a2}Z_{a3} + Z_{a3}Z_{a4} + Z_{a4}Z_{a5}$
$+ Z_{b1}Z_{b2} + Z_{b2}Z_{b3} + Z_{b3}Z_{b4}$
$+ Z_{c1}Z_{c2} + Z_{c2}Z_{c3}$
$+ Y_{d1}Z_{e1}Y_{d2}Z_{e2}$ [step2]
$\rightarrow Z_{a1}Z_{a2} + Z_{a2}Z_{a3} + Z_{a3}Z_{a4} + Z_{a4}Z_{a5}$
$+ Z_{b1}Z_{b2} + Z_{b2}Z_{b3} + Z_{b3}Z_{b4}$
$+ X_{c1}X_{c2} + X_{c2}X_{c3}$
$+ Z_{d1}Z_{d2}Z_{e1}Z_{e2}$ [step3]
$\rightarrow Z_{a1}Z_{a2} + Z_{a2}Z_{a3} + Z_{a3}Z_{a4} + Z_{a4}Z_{a5}$
$+ Z_{b1}Z_{b2} + Z_{b2}Z_{b3} + Z_{b3}Z_{b4}$
$+ Z_{d1}Y_{c1}Z_{d2}Y_{c2} + Z_{d2}Y_{c2}Z_{d3}Y_{c3}$
$+ Z_{d1}Z_{d2}Z_{e1}Z_{e2}$ [step4]
$\rightarrow Z_{a1}Z_{a2} + Z_{a2}Z_{a3} + Z_{a3}Z_{a4} + Z_{a4}Z_{a5}$
$+ X_{b1}X_{b2} + X_{b2}X_{b3} + X_{b3}X_{b4}$
$+ Z_{c1}Z_{c2}Z_{d1}Z_{d2} + Z_{c2}Z_{c3}Z_{d2}Z_{d3}$
$+ Z_{d1}Z_{d2}Z_{e1}Z_{e2}$ [step5]
$\rightarrow Z_{a1}Z_{a2} + Z_{a2}Z_{a3} + Z_{a3}Z_{a4} + Z_{a4}Z_{a5}$
$+ Z_{c1}Y_{b1}Z_{c2}Y_{b2} + Z_{c2}Y_{b2}Z_{c3}Y_{b3} + Z_{c3}Y_{b3}Z_{c4}Y_{b4}$
$+ Z_{c1}Z_{c2}Z_{d1}Z_{d2} + Z_{c2}Z_{c3}Z_{d2}Z_{d3}$
$+ Z_{d1}Z_{d2}Z_{e1}Z_{e2}$ [step6]
$\rightarrow X_{a1}X_{a2} + X_{a2}X_{a3} + X_{a3}X_{a4} + X_{a4}X_{a5}$
$+ Z_{b1}Z_{b2}Z_{c1}Z_{c2} + Z_{b2}Z_{b3}Z_{c2}Z_{c3} + Z_{b3}Z_{b4}Z_{c3}Z_{c4}$
$+ Z_{c1}Z_{c2}Z_{d1}Z_{d2} + Z_{c2}Z_{c3}Z_{d2}Z_{d3}$
$+ Z_{d1}Z_{d2}Z_{e1}Z_{e2}$ [step7]
$\rightarrow Z_{b1}Y_{a1}Z_{b2}Y_{a2} + Z_{b2}Y_{a2}Z_{b3}Y_{a3} + Z_{b3}Y_{a3}Z_{b4}Y_{a4} + Z_{b4}Y_{a4}Z_{b5}Y_{a5}$
$+ Z_{b1}Z_{b2}Z_{c1}Z_{c2} + Z_{b2}Z_{b3}Z_{c2}Z_{c3} + Z_{b3}Z_{b4}Z_{c3}Z_{c4}$
$+ Z_{c1}Z_{c2}Z_{d1}Z_{d2} + Z_{c2}Z_{c3}Z_{d2}Z_{d3}$
$+ Z_{d1}Z_{d2}Z_{e1}Z_{e2}$ [step8]
$\rightarrow Z_{a1}Z_{a2}Z_{b1}Z_{b2} + Z_{a2}Z_{a3}Z_{b2}Z_{b3} + Z_{a3}Z_{a4}Z_{b3}Z_{b4} + Z_{a4}Z_{a5}Z_{b4}Z_{b5}$
$+ Z_{b1}Z_{b2}Z_{c1}Z_{c2} + Z_{b2}Z_{b3}Z_{c2}Z_{c3} + Z_{b3}Z_{b4}Z_{c3}Z_{c4}$
$+ Z_{c1}Z_{c2}Z_{d1}Z_{d2} + Z_{c2}Z_{c3}Z_{d2}Z_{d3}$
$+ Z_{d1}Z_{d2}Z_{e1}Z_{e2}$ [step9]

FIG.24

$H_{tgt} = Z_{a1}Z_{a2} + Z_{a2}Z_{a3} + Z_{a3}Z_{a4} + Z_{a4}Z_{a5}$
$\quad + Z_{b1}Z_{b2} + Z_{b2}Z_{b3} + Z_{b3}Z_{b4}$
$\quad + Z_{d1}Z_{d2} + Z_{d2}Z_{d3}$
$\quad + Z_{e1}Z_{e2}$ [start]
$\rightarrow Z_{a1}Z_{a2} + Z_{a2}Z_{a3} + Z_{a3}Z_{a4} + Z_{a4}Z_{a5}$
$\quad + X_{b1}X_{b2} + X_{b2}X_{b3} + X_{b3}X_{b4}$
$\quad + X_{d1}X_{d2} + X_{d2}X_{d3}$
$\quad + Z_{e1}Z_{e2}$ [step1]
$\rightarrow Z_{a1}Z_{a2} + Z_{a2}Z_{a3} + Z_{a3}Z_{a4} + Z_{a4}Z_{a5}$
$\quad + Y_{b1}Z_{c1}Y_{b2}Z_{c2} + Y_{b2}Z_{c2}Y_{b3}Z_{c3} + Y_{b3}Z_{c3}Y_{b4}Z_{c4}$
$\quad + Y_{d1}Z_{c1}Y_{d2}Z_{c2} + Y_{d2}Z_{c2}Y_{d3}Z_{c3}$
$\quad + Z_{e1}Z_{e2}$ [step2]
$\rightarrow X_{a1}X_{a2} + X_{a2}X_{a3} + X_{a3}X_{a4} + X_{a4}X_{a5}$
$\quad + Z_{b1}Z_{c1}Z_{b2}Z_{c2} + Z_{b2}Z_{c2}Z_{b3}Z_{c3} + Z_{b3}Z_{c3}Z_{b4}Z_{c4}$
$\quad + Z_{d1}Z_{c1}Z_{d2}Z_{c2} + Z_{d2}Z_{c2}Z_{d3}Z_{c3}$
$\quad + X_{e1}X_{e2}$ [step3]
$\rightarrow Y_{a1}Z_{b1}Y_{a2}Z_{b2} + Y_{a2}Z_{b2}Y_{a3}Z_{b3} + Y_{a3}Z_{b3}Y_{a4}Z_{b4} + Y_{a4}Z_{b4}Y_{a5}Z_{b5}$
$\quad + Z_{b1}Z_{b2}Z_{c1}Z_{c2} + Z_{b2}Z_{b3}Z_{c2}Z_{c3} + Z_{b3}Z_{b4}Z_{c3}Z_{c4}$
$\quad + Z_{c1}Z_{c2}Z_{d1}Z_{d2} + Z_{c2}Z_{c3}Z_{d2}Z_{d3}$
$\quad + Y_{e1}Z_{d1}Y_{e2}Z_{d2}$ [step4]
$\rightarrow Z_{a1}Z_{b1}Z_{a2}Z_{b2} + Z_{a2}Z_{b2}Z_{a3}Z_{b3} + Z_{a3}Z_{b3}Z_{a4}Z_{b4} + Z_{a4}Z_{b4}Z_{a5}Z_{b5}$
$\quad + Z_{b1}Z_{b2}Z_{c1}Z_{c2} + Z_{b2}Z_{b3}Z_{c2}Z_{c3} + Z_{b3}Z_{b4}Z_{c3}Z_{c4}$
$\quad + Z_{c1}Z_{c2}Z_{d1}Z_{d2} + Z_{c2}Z_{c3}Z_{d2}Z_{d3}$
$\quad + Z_{e1}Z_{d1}Z_{e2}Z_{d2}$ [step5]

FIG.25

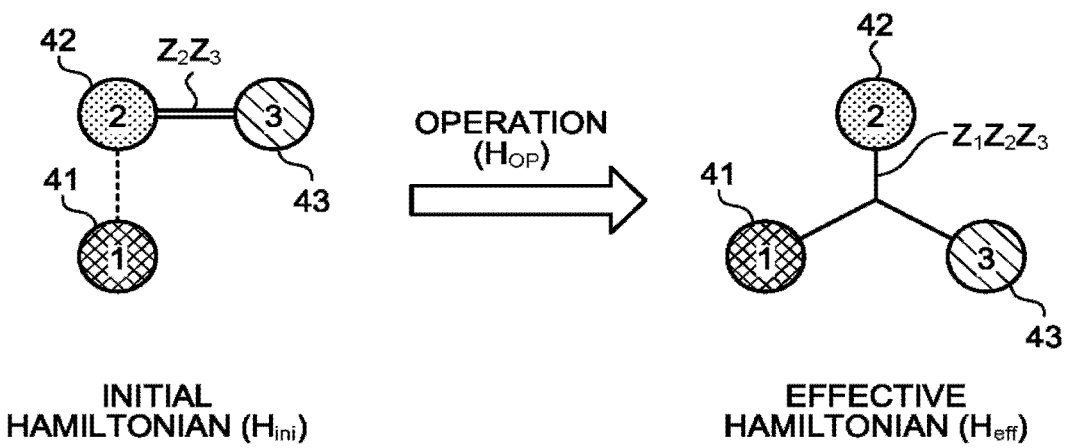

INITIAL HAMILTONIAN ($H_{ini}$) — OPERATION ($H_{OP}$) → EFFECTIVE HAMILTONIAN ($H_{eff}$)

FIG.29

$H_{tgt} = Z_{a1}Z_{p1} + Z_{a2}Z_{p2} + Z_{a3}Z_{p3}$
$+ Z_{b1}Z_{p1} + Z_{b2}Z_{p2} + Z_{b3}Z_{p3}$
$+ Z_{b1}Z_{q1} + Z_{b2}Z_{q2}$
$+ Z_{c1}Z_{q1} + Z_{c2}Z_{q2}$
$+ Z_{c1}Z_{r1}$
$+ Z_{d1}Z_{r1}$ [start]
$\rightarrow Z_{a1}Z_{p1} + Z_{a2}Z_{p2} + X_{a3}Z_{p3}$
$+ Z_{b1}Z_{p1} + Z_{b2}Z_{p2} + X_{b3}Z_{p3}$
$+ Z_{b1}Z_{q1} + Z_{b2}Z_{q2}$
$+ Z_{c1}Z_{q1} + Z_{c2}Z_{q2}$
$+ Z_{c1}Z_{r1}$
$+ Z_{d1}Z_{r1}$ [step1]
$\rightarrow Z_{a1}Z_{p1} + Z_{a2}Z_{p2} + Y_{a3}Z_{a4}Z_{p3}$
$+ Z_{b1}Z_{p1} + Z_{b2}Z_{p2} + Y_{b3}Z_{b4}Z_{p3}$
$+ Z_{b1}Z_{q1} + Z_{b2}Z_{q2}$
$+ Z_{c1}Z_{q1} + Z_{c2}Z_{q2}$
$+ Z_{c1}Z_{r1}$
$+ Z_{d1}Z_{r1}$ [step2]
$\rightarrow Z_{a1}Z_{p1} + X_{a2}Z_{p2} + Y_{a3}Z_{a4}Z_{p3}$
$+ Z_{b1}Z_{p1} + X_{b2}Z_{p2} + Y_{b3}Z_{b4}Z_{p3}$
$+ Z_{b1}Z_{q1} + X_{b2}Z_{q2}$
$+ Z_{c1}Z_{q1} + X_{c2}Z_{q2}$
$+ Z_{c1}Z_{r1}$
$+ Z_{d1}Z_{r1}$ [step3]

FIG.30

$\rightarrow Z_{a1}Z_{p1} + Y_{a2}Z_{a3}Z_{p2} + Z_{a3}Z_{a4}Z_{p3}$
$+ Z_{b1}Z_{p1} + Y_{b2}Z_{b3}Z_{p2} + Z_{b3}Z_{b4}Z_{p3}$
$+ Z_{b1}Z_{q1} + Y_{b2}Z_{b3}Z_{q2}$
$+ Z_{c1}Z_{q1} + Y_{c2}Z_{c3}Z_{q2}$
$+ Z_{c1}Z_{r1}$
$+ Z_{d1}Z_{r1}$ [step4]
$\rightarrow X_{a1}Z_{p1} + Y_{a2}Z_{a3}Z_{p2} + Z_{a3}Z_{a4}Z_{p3}$
$+ X_{b1}Z_{p1} + Y_{b2}Z_{b3}Z_{p2} + Z_{b3}Z_{b4}Z_{p3}$
$+ X_{b1}Z_{q1} + Y_{b2}Z_{b3}Z_{q2}$
$+ X_{c1}Z_{q1} + Y_{c2}Z_{c3}Z_{q2}$
$+ X_{c1}Z_{r1}$
$+ X_{d1}Z_{r1}$ [step5]
$\rightarrow Y_{a1}Z_{a2}Z_{p1} + Z_{a2}Z_{a3}Z_{p2} + Z_{a3}Z_{a4}Z_{p3}$
$+ Y_{b1}Z_{b2}Z_{p1} + Z_{b2}Z_{b3}Z_{p2} + Z_{b3}Z_{b4}Z_{p3}$
$+ Y_{b1}Z_{b2}Z_{q1} + Z_{b2}Z_{b3}Z_{q2}$
$+ Y_{c1}Z_{c2}Z_{q1} + Z_{c2}Z_{c3}Z_{q2}$
$+ Y_{c1}Z_{c2}Z_{r1}$
$+ Y_{d1}Z_{d2}Z_{r1}$ [step6]
$\rightarrow Z_{a1}Z_{a2}Z_{p1} + Z_{a2}Z_{a3}Z_{p2} + Z_{a3}Z_{a4}Z_{p3}$
$+ Z_{b1}Z_{b2}Z_{p1} + Z_{b2}Z_{b3}Z_{p2} + Z_{b3}Z_{b4}Z_{p3}$
$+ Z_{b1}Z_{b2}Z_{q1} + Z_{b2}Z_{b3}Z_{q2}$
$+ Z_{c1}Z_{c2}Z_{q1} + Z_{c2}Z_{c3}Z_{q2}$
$+ Z_{c1}Z_{c2}Z_{r1}$
$+ Z_{d1}Z_{d2}Z_{r1}$ [step7]

FIG.31
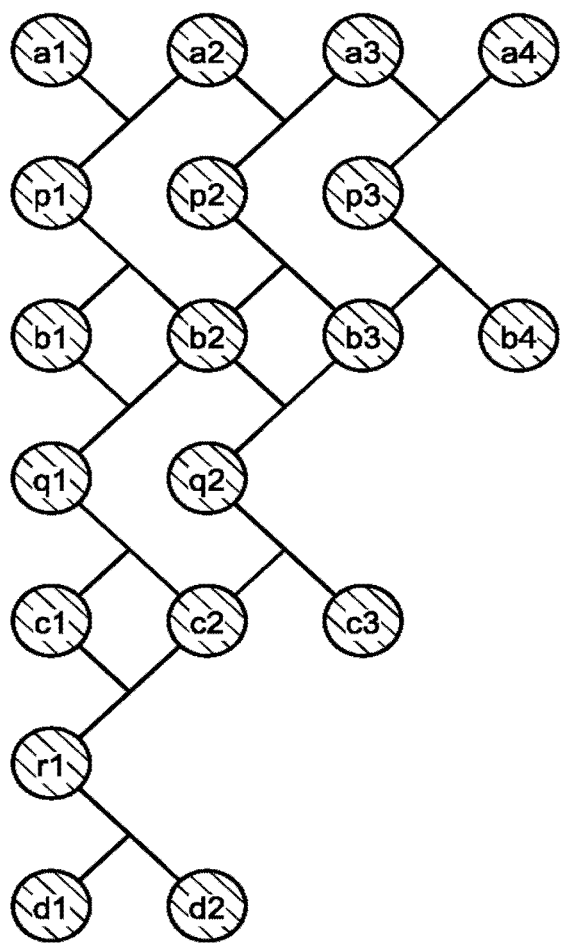
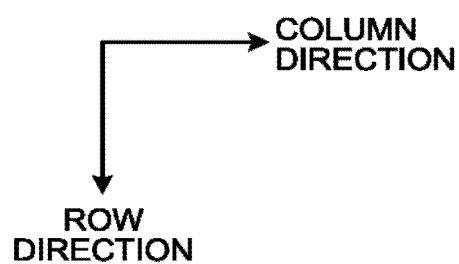

QUANTUM ANNEALING APPARATUS

CROSS-REFERENCE TO RELATED APPLICATIONS

This application is based upon and claims the benefit of priority from Japanese Patent Application No. 2018-173388, filed on Sep. 18, 2018; the entire contents of which are incorporated herein by reference.

FIELD

Embodiments described herein relate generally to a quantum annealing apparatus.

BACKGROUND

Quantum annealing machines that solve optimization problems are known. The quantum annealing machines solve combinations of states of spins that minimize or maximize the Ising model in the following Formula (1) by using a quantum tunneling phenomenon.

$$H = \sum_{j<k} J_{jk} s_j^z s_k^z + \sum_j h_j s_j^z \quad (1)$$

In Formula (1), $S_j^z$ is a Z component of an operator representing a spin and takes a binary value of −1 or +1. In Formula (1), j and k represent indices of spins. $J_{jk}$ is a parameter representing interaction between the j-th spin and the k-th spin. $h_j$ is a parameter representing a function of being added independently to the j-th spin.

The Hamiltonian (H) applied to the quantum annealing machine is expressed by the following Formula (2).

$$H = \sum_{j<k} J_{jk} \sigma_j^z \sigma_k^z + \sum_j [h_j \sigma_j^z + \Delta_j(t) \sigma_j^x] \quad (2)$$

In Formula (2), j, k, $J_{jk}$, and $h_j$ are the same as those in Formula (1). In Formula (2), t represents a time. $\sigma_j^z$ is a Pauli matrix representing the Z component of the j-th spin. $\sigma_k^z$ is a Pauli matrix representing the Z component of the k-th spin. The quantum annealing machine replaces spins with quantum bits and outputs $\sigma_j^z$ of a combination that minimizes energy.

In the quantum annealing machine, various techniques have been studied in order to couple two or more arbitrary quantum bits to generate interaction. For example, a quantum annealing machine using two-dimensionally arranged memory cells formed in a semiconductor device as a plurality of quantum bits has been proposed. In such a quantum annealing machine, the proximity Coulomb force of two adjacent memory cells becomes interaction.

However, in the quantum annealing machine, it was very difficult to set interaction of three or more quantum bits of various combinations.

Non-patent document 2: Vicky Choi, "Minor-embedding in adiabatic quantum calculation: II. Minor-universal graph design", Quantum Information Processing: Volume 10, Issue 3, P. 343, (2011)

Non-Patent Document 3: Vicky Choi, "Minor-Embedding in Adiabatic Quantum Computation: I. The Parameter Setting Problem", Quantum Information Processing, 7, pp 193-209, 2008

Non-Patent Document 4: T. Tanamoto, "Implementation of standard quantum error correction codes for solid-state quantum bits", Phys. Rev. A. 88 062334, (2013)

Non-Patent Document 6: M. Leib, P. Zoller, W. Lechner, "A transmon quantum annealer: Decomposing many-body icing constraints to pair interaction", Quantum Science and Technology 1 (1), 015008

A quantum annealing apparatus according to an embodiment includes a quantum calculation unit, an input unit, an operation unit, and an output unit. The quantum calculation unit includes a plurality of quantum bits coupled according to initial Hamiltonian. The input unit applies data to the plurality of quantum bits. The operation unit operates the plurality of quantum bits. The output unit acquires and outputs components in a Z axis from the plurality of quantum bits. The operation unit executes a selecting process of selecting a first quantum bit and a second quantum bit and a third quantum bit coupled according to initial Hamiltonian among the plurality of quantum bits, a first rotating operation of rotating each of the second quantum bit and the third quantum bit by 90° around a first axis perpendicular to the Z axis, an interaction operation of causing the first quantum bit and the second quantum bit to interact with each other, and a second rotating operation of rotating each of the second quantum bit and the third quantum bit by 90° around a second axis perpendicular to the Z axis and the first axis.

BRIEF DESCRIPTION OF THE DRAWINGS

FIG. 21 is a diagram illustrating an example of operations by an operation unit according to the fourth embodiment;

FIG. 24 is a diagram illustrating an example of operations by an operation unit according to Modified Example of the fourth embodiment;

FIG. 25 is a diagram illustrating a deforming operation of Hamiltonian in a fifth embodiment;

FIG. 29 is a diagram illustrating an example of operations by an operation unit according to the sixth embodiment;

FIG. 30 is a diagram illustrating an example of an operation subsequent to FIG. 29;

FIG. 31 is a diagram illustrating Hamiltonian after conversion by an operation unit according to the sixth embodiment;

DETAILED DESCRIPTION

Figure 1:
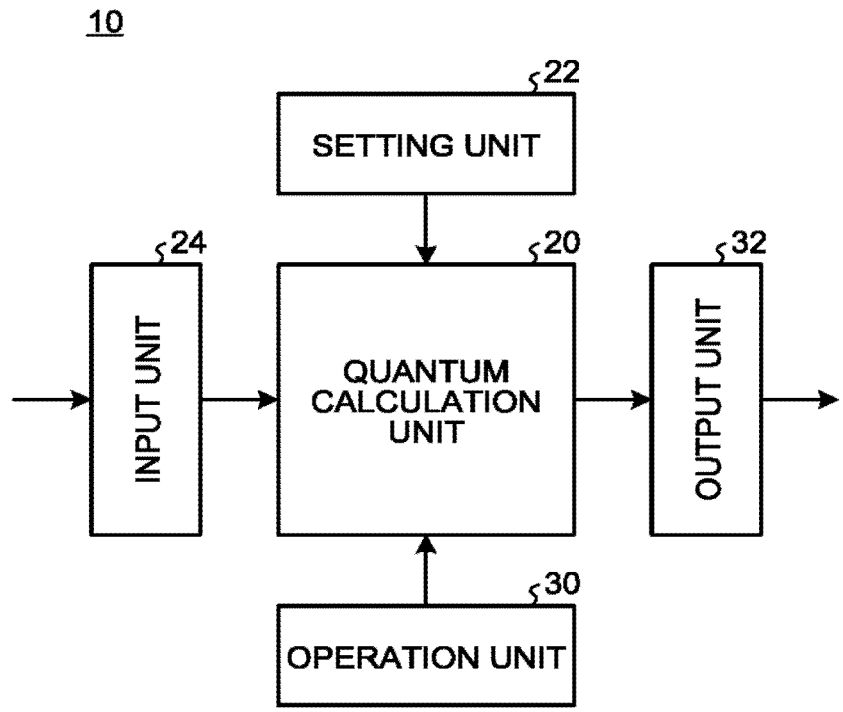
FIG. 1 is a diagram illustrating the entire configuration of a quantum annealing apparatus.

According to an embodiment, a quantum annealing apparatus includes a quantum calculation unit, an input unit, an operation unit, and an output unit. The quantum calculation unit includes a plurality of quantum bits coupled according to initial Hamiltonian. The input unit applies data to the plurality of quantum bits. An operation unit operates the plurality of quantum bits. The output unit acquires and outputs components in a Z axis from the plurality of quantum bits. The operation unit executes: a selecting process of selecting a first quantum bit, a second quantum bit and a third quantum bit among the plurality of quantum bits, the second quantum bit and the third quantum bit being coupled in the quantum calculation unit; a first rotating operation of rotating each of the second quantum bit and the third quantum bit by 90° around a first axis perpendicular to the Z axis; an interaction operation of causing the first quantum bit and the second quantum bit to interact with each other; and a second rotating operation of rotating each of the second quantum bit and the third quantum bit by 90° around a second axis perpendicular to the Z axis and the first axis.

Hereinafter, quantum annealing apparatuses 10 according to embodiments will be described. In addition, in the following embodiments, the portions denoted by the same reference numerals indicate substantially the same members or operations, and duplicate description thereof will be omitted except for differences.

Premise

In this embodiment, i represents an imaginary unit. In this embodiment, j, k, l, and m represent indices of quantum bits.

A physical system develops in time as illustrated in the following Formula (11). $|\Psi(0)\rangle$ is a wave function of the physical system at a time of t=0. $|\Psi(t)\rangle$ is a wave function of the physical system after a time of t. H is Hamiltonian.

$$|\Psi(t)\rangle = e^{-itH}|\Psi(0)\rangle \quad (11)$$

Next, a change of the Hamiltonian in a case of applying a pulse or the like from the outside to the physical system is considered. Hamiltonian (initial Hamiltonian) at a time of t=0 is denoted by $H_{ini}$. Hamiltonian (operation Hamiltonian) provided to the physical system by an operation is denoted by $H_{OP}$. In a case where an operation is applied to the physical system for a time of $\tau_{OP}$, effective Hamiltonian $H_{eff}$ of the physical system is expressed by the following Formula (12).

$$H_{eff} \rightarrow e^{-i\tau_{OP}H_{OP}} H_{ini} \, e^{i\tau_{OP}H_{OP}} \quad (12)$$

Formula (12) expresses that an operation corresponding to $H_{op}$ is applied twice to the physical system indicated by $H_{ini}$ with inverting the sign. In this manner, in a case where an operation of applying a pulse or the like from the outside to the physical system performed, the Hamiltonian of the physical system can be changed from the initial state. In this embodiment, the Hamiltonian of the physical system is changed by using such an operation.

In addition, in this embodiment, for simplifying the description, the Pauli matrix is expressed as follows.

$$\sigma^X_j \rightarrow X_j$$

$$\sigma^Y_j \rightarrow Y_j$$

$$\sigma^Z_j \rightarrow Z_j$$

$X_j$ is a matrix representing the X-axis component of the quantum bit of the index j. $Y_j$ is a matrix representing the Y-axis component of the quantum bit of the index j. $Z_j$ is a matrix representing the Z-axis component of the quantum bit of the index j.

In addition, the relational formula of the following Formula (13) is satisfied.

$$e^{-i\theta Z_j Z_k} Y_j e^{i\theta Z_j Z_k} = \cos(2\theta) Y_j - \sin(2\theta) X_j Z_k \quad (13)$$

Herein, it is assumed that $H_{OP}=J_{jk}Z_jZ_k$, $\tau_{OP}=\theta/J_{jk}$, and $H_{ini}=Y_j$. Then, it is assumed that the interaction ($J_{jk}Z_jZ_k$) between the quantum bit of the index j and the quantum bit of the index k is applied from the outside with respect to the Y-axis component ($Y_j$) of the quantum bit of the index j for a time of ($\theta/J_{jk}$). In this case, Formula (12) can be expressed by the following Formula (14) by using the relational formula of Formula (13).

$$Y_j \rightarrow \cos(2\theta)Y_j - \sin(2\theta)X_jZ_k \quad (14)$$

In particular, in a case where $\theta=\pi/4=45°$, the following Formula (15) is satisfied.

$$Y_j \rightarrow -X_jZ_k \quad (15)$$

In addition, the relational formula of the following Formula (17) is satisfied.

$$e^{-i\theta Z_j Z_k} X_j e^{i\theta Z_j Z_k} = \cos(2\theta)X_j + \sin(2\theta)Y_jZ_k \quad (17)$$

Herein, it is assumed that $H_{OP}=J_{jk}Z_jZ_k$, $\tau_{OP}=\theta/J_{jk}$, and $H_{ini}=X_j$. Then, it is assumed that the interaction $(J_{jk}Z_jZ_k)$ between the quantum bit of the index j and the quantum bit of the index k is applied from the outside with respect to the K-axis component $(X_j)$ of the quantum bit of the index j for a time of $(\theta/J_{jk})$. In this case, Formula (12) can be expressed by the following Formula (18) by using the relational formula of Formula (17).

$$Y_j \to \cos(2\theta)X_j + \sin(2\theta)Y_jZ_k \quad (18)$$

In particular, in a case where $\theta=\pi/4=45°$ (that is, $2\theta=90°$ in Formula (18)), the following Formula (19) is satisfied.

$$X_j \to Y_jZ_k \quad (19)$$

In the quantum annealing apparatus 10 according to each embodiment described below, by performing an operation of applying a pulse or the like from the outside to the quantum bits, the Hamiltonian is effectively changed as illustrated in the relational formula expressed in Formula (15) or Formula (19).

First Embodiment

A quantum annealing apparatus 10 according to a first embodiment converts interaction of two quantum bits to interaction of four quantum bits and executes quantum calculation.

FIG. 1 is a diagram illustrating the entire configuration of the quantum annealing apparatus 10. The quantum annealing apparatus 10 includes a quantum calculation unit 20, a setting unit 22, an input unit 24, an operation unit 30, and an output unit 32.

The quantum calculation unit 20 includes a plurality of quantum bits. Quantum bits may be realized in any manner. For example, the quantum bits may be realized by using superconducting elements, may be realized by using semiconductor elements, or may be realized by using a molecular array.

In this embodiment, the quantum calculation unit 20 includes a plurality of memory cells as a plurality of quantum bits. Each of the plurality of memory cells is coupled with another memory cell by Coulomb interaction according to capacitance junction. Each of the plurality of memory cells includes, for example, a semiconductor floating gate structure. In addition, in this embodiment, the quantum calculation unit 20 includes a plurality of quantum bits that are two-dimensionally arranged in a matrix shape (lattice shape).

In addition, the plurality of quantum bits included in the quantum calculation unit 20 are coupled according to the initial Hamiltonian. The respective components of the two quantum bits coupled according to the initial Hamiltonian are changed according to the interaction.

In addition, the components of each of the plurality of quantum bits are rotatable by an operation of a pulse or the like applied from the outside. For example, the components of each of the plurality of quantum bits can be rotated by angles specified around the X axis, the Y axis, and the Z axis by an operation applied from the outside.

In addition, the quantum calculation unit 20 can adjust the interaction of specific two quantum bits among a plurality of quantum bits according to an operation from the outside. For example, the quantum calculation unit 20 includes a control quantum bit that turns on or off the interaction of specific two quantum bits. The quantum calculation unit 20 may include a plurality of pairs of two quantum bits of which interaction can be adjusted. Such a control quantum bit is described in, for example, Antti O. Niskanen, Yasunobu Nakamura, and Jaw-Shen Tsai, "Tunable coupling scheme for flux quantum bits at the optimal point", Phys. Rev. B 73, 094506, (2006) and the like. In addition, two quantum bits of which interaction can be adjusted according to an operation from the outside are not coupled according to the initial Hamiltonian. In addition, in the quantum calculation unit 20, interaction does not occur between two quantum bits that are not coupled according to the initial Hamiltonian and of which interaction is not adjusted according to an operation from the outside.

The setting unit 22 receives definition information of the initial Hamiltonian in advance. The setting unit 22 changes the coupling relationship of the plurality of quantum bits included in the quantum calculation unit 20 according to the definition information of the initial Hamiltonian. In a case where the initial Hamiltonian is structurally incorporated in the quantum calculation unit 20 and the coupling relationship cannot be changed later, the quantum annealing apparatus 10 may be configured not to include the setting unit 22.

The input unit 24 receives data from the outside. The input unit 24 stores the received data in the specified quantum bits included in the quantum calculation unit 20. In a case where the received data is a digital value of 0 or 1, the input unit 24 sets the component of the corresponding quantum bit to $|0\rangle$ or $|1\rangle$.

The operation unit 30 receives the definition information of the operation Hamiltonian in advance. During the calculation of the quantum calculation unit 20, the operation unit 30 applies an operation according to the definition information to a pair of the quantum bit specified by the definition information and two quantum bits specified by the definition information.

After the calculation by the quantum calculation unit 20 is completed, the output unit 32 acquires the Z-axis components from the plurality of quantum bits included in the quantum calculation unit 20. Then, the output unit 32 binarizes each of the acquired Z-axis components of the plurality of quantum bits to −1 or +1 and outputs the result.

Figure 2:
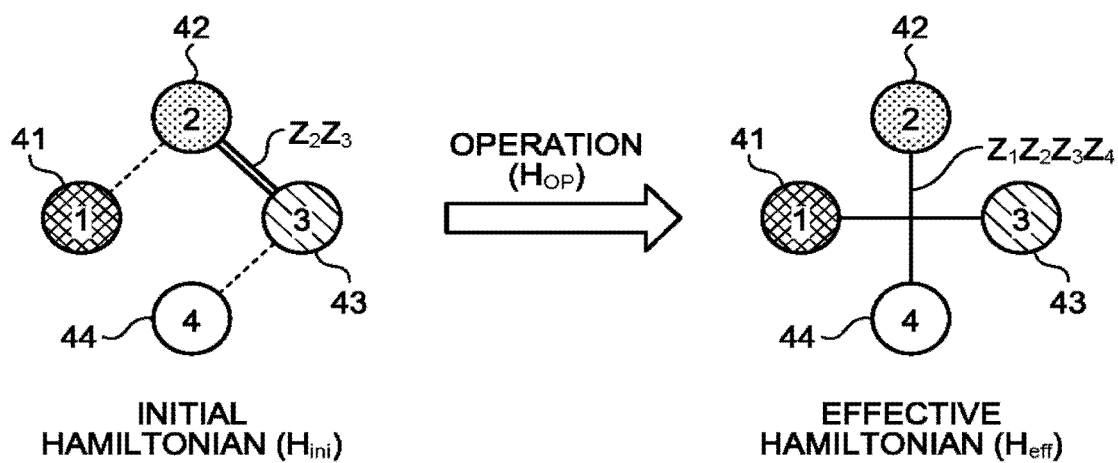
FIG. 2 is a diagram illustrating Hamiltonian before and after operations in a first embodiment.

FIG. 2 is a diagram illustrating the Hamiltonian of the selected four quantum bits and the effective Hamiltonian after the operations in the first embodiment.

In addition, in this embodiment, the quantum bits are indicated by circles in the figure. In addition, a double line connecting two circles indicates a relationship between the two quantum bits coupled according to the initial Hamiltonian set in the quantum calculation unit 20. In addition, a dotted line connecting two circles indicates a relationship between two quantum bits to which the operation unit 30 can apply interaction by performing an operation from the outside. In addition, a straight line connecting a plurality of circles indicates a relationship among a plurality of quantum bits among which mutual relations are effectively formed as a result of an operation.

During the operation by the quantum calculation unit 20, the operation unit 30 selects a set including a first quantum hit 41, a second quantum bit 42, a third quantum bit 43, and a fourth quantum bit 44 among a plurality of quantum bits included in the quantum calculation unit 20.

The second quantum bit 42 and the third quantum bit 43 are coupled with a strength set according to the initial Hamiltonian.

The first quantum bit 41 is not coupled with the second quantum bit 42 and the third quantum bit 43. However, the first quantum bit 41 is connected to the second quantum bit 42 via, for example, a control quantum bit, and thus, the interaction with the second quantum bit 42 can be adjusted according to an operation from the outside.

The fourth quantum bit 44 is not coupled with the second quantum bit 42 and the third quantum bit 43. However, the fourth quantum bit 44 is connected to the third quantum bit 43 via, for example, a control quantum bit and thus, the interaction with the third quantum bit 43 can be adjusted according to an operation from the outside.

The operation unit 30 applies a pulse or the like from the outside to the selected first quantum bit 41, second quantum bit 42, third quantum bit 43, and fourth quantum bit 44 and executes the operation according to the operation Hamiltonian $H_{OP}$. As a result, the operation unit 30 can cause the selected first quantum bit 41, second quantum bit 42, third quantum bit 43, and fourth quantum bit 44 to interact with each other according to the effective Hamiltonian expressed by $H_{eff}=Z_1Z_2Z_3Z_4$.

As described above, the quantum annealing apparatus 10 according to the first embodiment converts the initial Hamiltonian including the interaction of two quantum bits to the effective Hamiltonian including the interaction of four quantum bits.

Figure 3:
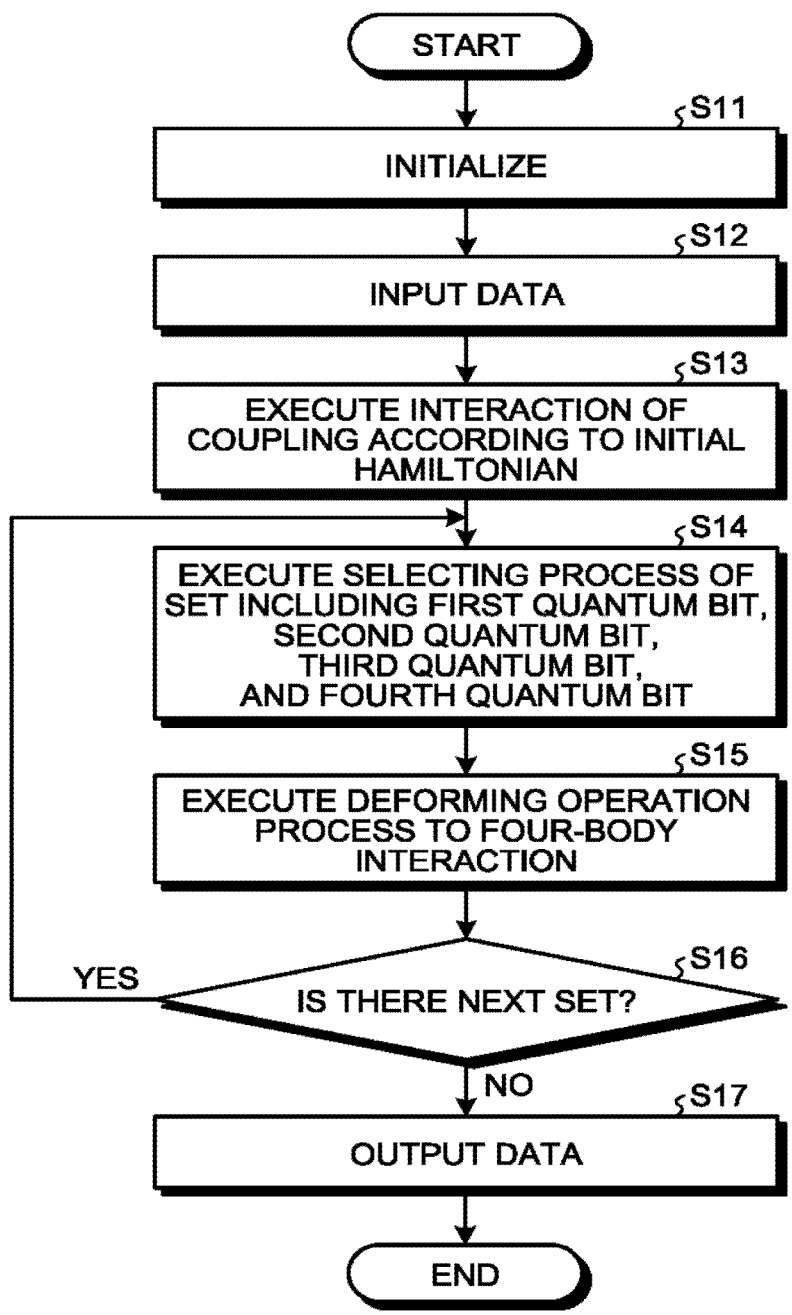
FIG. 3 is a diagram illustrating a flow of processes of the quantum annealing apparatus according to the first embodiment.

FIG. 3 is a flowchart illustrating a flow of processes of the quantum annealing apparatus 10 according to the first embodiment. The quantum annealing apparatus 10 according to the first embodiment executes processes in the flow illustrated in FIG. 3.

First, in S11, the operation unit 30 initializes all of the plurality of quantum bits included in the quantum calculation unit 20. Subsequently, in S12, the input unit 24 receives data from the outside and sets states of the plurality of quantum bits included in the quantum calculation unit 20 according to the received data. Subsequently, in S13, the quantum calculation unit 20 causes the interaction of coupling according to a preset initial Hamiltonian to function for the plurality of quantum bits.

Subsequently, in S14, the operation unit 30 selects four quantum bits to be subject to four-body interaction among the plurality of quantum bits included in the quantum calculation unit 20. That is, the quantum calculation unit 20 selects a set including four quantum bits (the first quantum bit 41, the second quantum bit 42, the third quantum bit 43, and the fourth quantum bit 44) having the relationship of FIG. 2.

Subsequently, in S15, the operation unit 30 executes a deforming operation to four-body interaction on the selected set. Details of the deforming operation will be further described in FIG. 4 and subsequent figures.

Subsequently, in S16, the operation unit 30 determines whether or not there is a next set requiring a deforming operation among the plurality of quantum bits included in the quantum calculation unit 20. If there is a next set (Yes in S16), the operation unit 30 returns the processing to S14 and selects the next set. If there is no next set (No in S16), the operation unit 30 advances the processing to S17.

In S17, the output unit 32 acquires the Z-axis components from each of the plurality of quantum bits included in the quantum calculation unit 20. Then, the output unit 32 binarizes each of the acquired Z-axis components of the plurality of quantum bits to −1 or +1 and outputs the result.

The quantum annealing apparatus 10 according to the first embodiment ends this flow when the process of S17 is completed.

Figure 4:
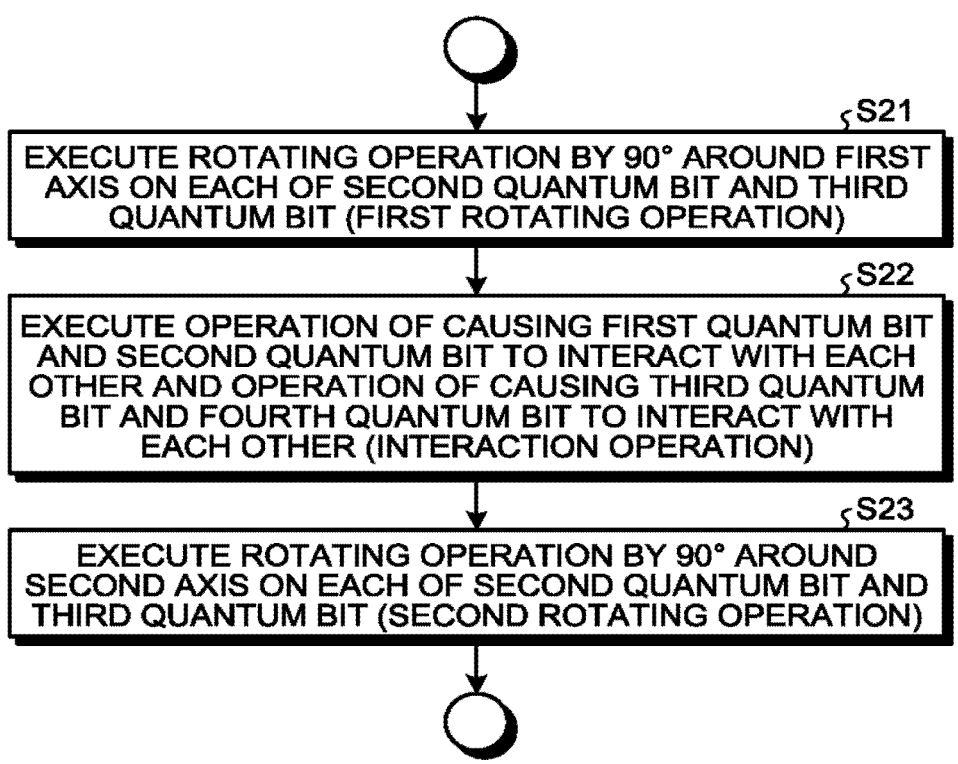
FIG. 4 is a diagram illustrating a deforming operation to four-body interaction in S15 by an operation unit.

FIG. 4 is a diagram illustrating contents of the deforming operation to four-body interaction in S15 by the operation unit 30.

The operation unit 30 executes a first rotating operation (S21), an interaction operation (S22), and a second rotating operation (S23) as a deforming operation to four-body interaction in S15.

In the first rotating operation (S21), the operation unit 30 performs a rotating operation of 90° around the first axis with respect to each of the second quantum bit 42 and the third quantum bit 43.

Herein, the first axis is an axis perpendicular to the Z axis. In addition, the second axis is an axis perpendicular to the Z axis and perpendicular to the first axis.

For example, the first axis is the X axis. In a case where the first axis is the X axis, the second axis is the Y axis. In addition, for example, the first axis is the Y axis. In a case where the first axis is the Y axis, the second axis is the X axis.

By executing the first rotating operation (S21), the axis component of the second quantum bit 42 and the third quantum bit 43 become the second-axis components. For example, in the first rotating operation (S21), in a case where the operation unit 30 performs a rotating operation of 90° around the X axis, the Z-axis components of the second quantum bit 42 and the third quantum bit 43 become the Y-axis components. In addition, for example, in the first rotating operation (S21), in a case where the operation unit 30 performs a rotating operation of 90° around the Y axis, the Z-axis components of the second quantum bit 42 and the third quantum bit 43 become the X-axis components.

In the interaction operation (S22), the operation unit 30 controls a control quantum bit and the like between the first quantum bit 41 and the second quantum bit 42 and causes the first quantum bit 41 and the second quantum bit 42 to interact with each other. At the same time, the operation unit 30 controls a control quantum bit and the like between the third quantum bit 43 and the fourth quantum bit 44 and causes the third quantum bit 43 and the fourth quantum bit 44 to interact with each other.

Herein, it is assumed that the interaction parameter between the first quantum bit 41 and the second quantum bit 42 is $J_{12}$. In this case, the operation unit 30 causes the first quantum bit 41 and the second quantum bit 42 to interact with each other for a time of $\tau_{OP}$ ($=\pi/4J_{12}$). As a result, the operation unit 30 can convert the interaction between the first quantum bit 41 and the second quantum bit 42 so as to satisfy the relational formula expressed in the above-described Formula (15) or (19).

In addition, it is assumed that the interaction parameter between the third quantum bit 43 and the fourth quantum bit 44 is $J_{34}$. In this case, the operation unit 30 causes the third quantum bit 43 and the fourth quantum bit 44 to interact with each other for a time of $\tau_{OP}$ ($=\pi/4J_{34}$). As a result, the operation unit 30 can convert the interaction between the third quantum bit 43 and the fourth quantum bit 44 so as to satisfy the relational formula expressed in the above-described Formula (15) or (19).

In the second rotating operation (S23), the operation unit 30 performs a rotating operation of 90° around the second axis with respect to each of the second quantum bit 42 and the third quantum bit 43.

By executing the second rotating operation (S23), the first-axis components of the second quantum bit 42 and the third quantum bit 43 become the Z-axis components. In addition, for example, in the second rotating operation (S23), in a case where the operation unit 30 performs a rotating operation of 90° around the Y axis, the X-axis components of the second quantum bit 42 and the third quantum bit 43 become the Z-axis components. For example, in the second rotating operation (S23), in a case where the operation unit 30 performs a rotating operation of 90° around the X axis, the Y-axis components of the second quantum bit 42 and the third quantum bit 43 become the Z-axis components.

Figure 5:
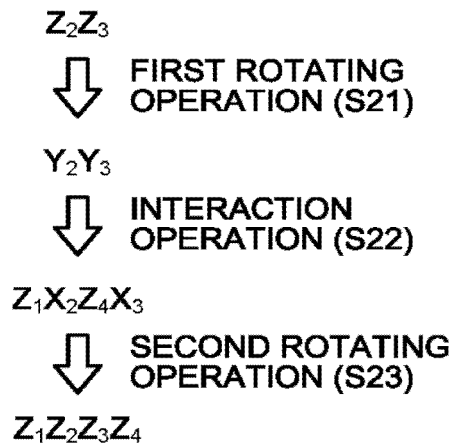
FIG. 5 is a diagram illustrating a first example of a change in interaction.

FIG. 5 is a diagram illustrating a change in interaction in a case where a rotating operation around the X axis is performed in the first rotating operation (S21) and a rotating operation around the Y axis is performed in the second rotating operation (S23).

In the first rotating operation (S21), the operation unit 30 performs a rotating operation of 90° around the X axis with respect to each of the second quantum bit 42 and the third quantum bit 43. As a result, the Z-axis component ($Z_2$) of the second quantum bit 42 is converted to the Y-axis component ($Y_2$). In addition, the Z-axis component ($Z_3$) of the third quantum bit 43 is converted to the Y-axis component ($Y_3$).

In the interaction operation (S22), the operation unit 30 performs an operation of applying a pulse or the like for a time of $\tau_{OP}$ ($=\pi/4J_{12}$) and causes the first quantum bit 41 and the second quantum bit 42 to interact with each other. As a result, the Y-axis component ($Y_2$) of the second quantum bit 42 is converted to the interaction between the Z-axis component ($Z_1$) of the first quantum bit 41 and the X-axis component ($X_2$) of the second quantum bit 42.

In the interaction operation (S22), the operation unit 30 performs an operation of applying a pulse or the like for a time of $\tau_{OP}$ ($=\pi/4J_{34}$) and causes the third quantum bit 43 and the fourth quantum bit 44 to interact with each other. As a result, the Y-axis component ($Y_3$) of the third quantum bit 43 is converted to the interaction between the Z-axis component ($Z_4$) of the fourth quantum bit 44 and the X-axis component ($X_3$) of the third quantum bit 43.

In the second rotating operation (S23), the operation unit 30 performs a rotating operation of 90° around the Y axis with respect to each of the second quantum bit 42 and the third quantum bit 43. As a result, the X-axis component ($X_2$) of the second quantum bit 42 is converted to the Z-axis component ($Z_2$). The X-axis component ($X_3$) of the third quantum bit 43 is converted to the Z-axis component ($Z_3$).

By performing the above operation, the operation unit 30 can effectively convert the interaction ($Z_2Z_3$) of two quantum bits to the interaction ($Z_1Z_2Z_3Z_4$) of four quantum bits.

Figure 6:
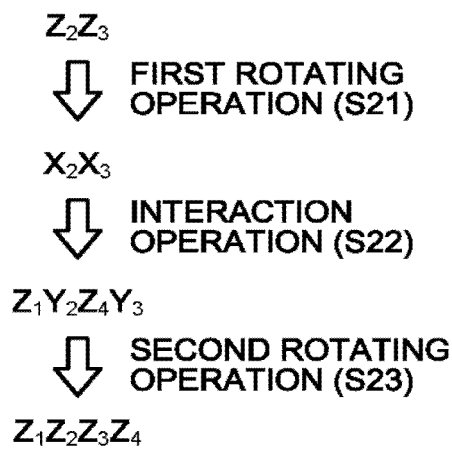
FIG. 6 is a diagram illustrating a second example of change in interaction.

FIG. 6 is a diagram illustrating a change in interaction in a case where a rotating operation around the Y axis is performed in the first rotating operation (S21) and a rotating operation around the X axis is performed in the second rotating operation (S23).

In the first rotating operation (S21), the operation unit 30 performs a rotating operation of 90° around the Y axis with respect to each of the second quantum bit 42 and the third quantum bit 43. As a result, the Z-axis component ($Z_2$) of the second quantum bit 42 is converted to the X-axis component ($X_2$). In addition, the Z-axis component ($Z_3$) of the third quantum bit 43 is converted to the X-axis component ($X_3$).

In the interaction operation (S22), the operation unit 30 performs an operation of applying a pulse or the like for a time of $\tau_{OP}$ ($=\pi/4J_{12}$) and causes the first quantum bit 41 and the second quantum bit 42 to interact with each other. As a result, the X-axis component ($X_2$) of the second quantum bit 42 is converted to the interaction between the Z-axis component ($Z_1$) of the first quantum bit 41 and the Y-axis component ($Y_2$) of the second quantum bit 42.

In the interaction operation (S22), the operation unit 30 performs an operation of applying a pulse or the like for a time of $\tau_{OP}$ ($=\pi/4J_{34}$) and causes the third quantum bit 43 and the fourth quantum bit 44 to interact with each other. As a result, the X-axis component ($X_3$) of the third quantum bit 43 is converted to the interaction between the Z-axis component ($Z_4$) of the fourth quantum bit 44 and the Y-axis component ($Y_3$) of the third quantum bit 43.

In the second rotating operation (S23), the operation unit 30 performs a rotating operation of 90° around the X axis with respect to each of the second quantum bit 42 and the third quantum bit 43. As a result, the Y-axis component ($Y_2$) of the second quantum bit 42 converted to the Z-axis component ($Z_2$). In addition, the Y-axis component ($Y_3$) of the third quantum bit 43 is converted to the Z-axis component ($Z_3$).

By executing the above operation, the operation unit 30 can effectively convert the interaction ($Z_2Z_3$) of two quantum bits to the interaction ($Z_1Z_2Z_3Z_4$) of four quantum bits.

Figure 7:
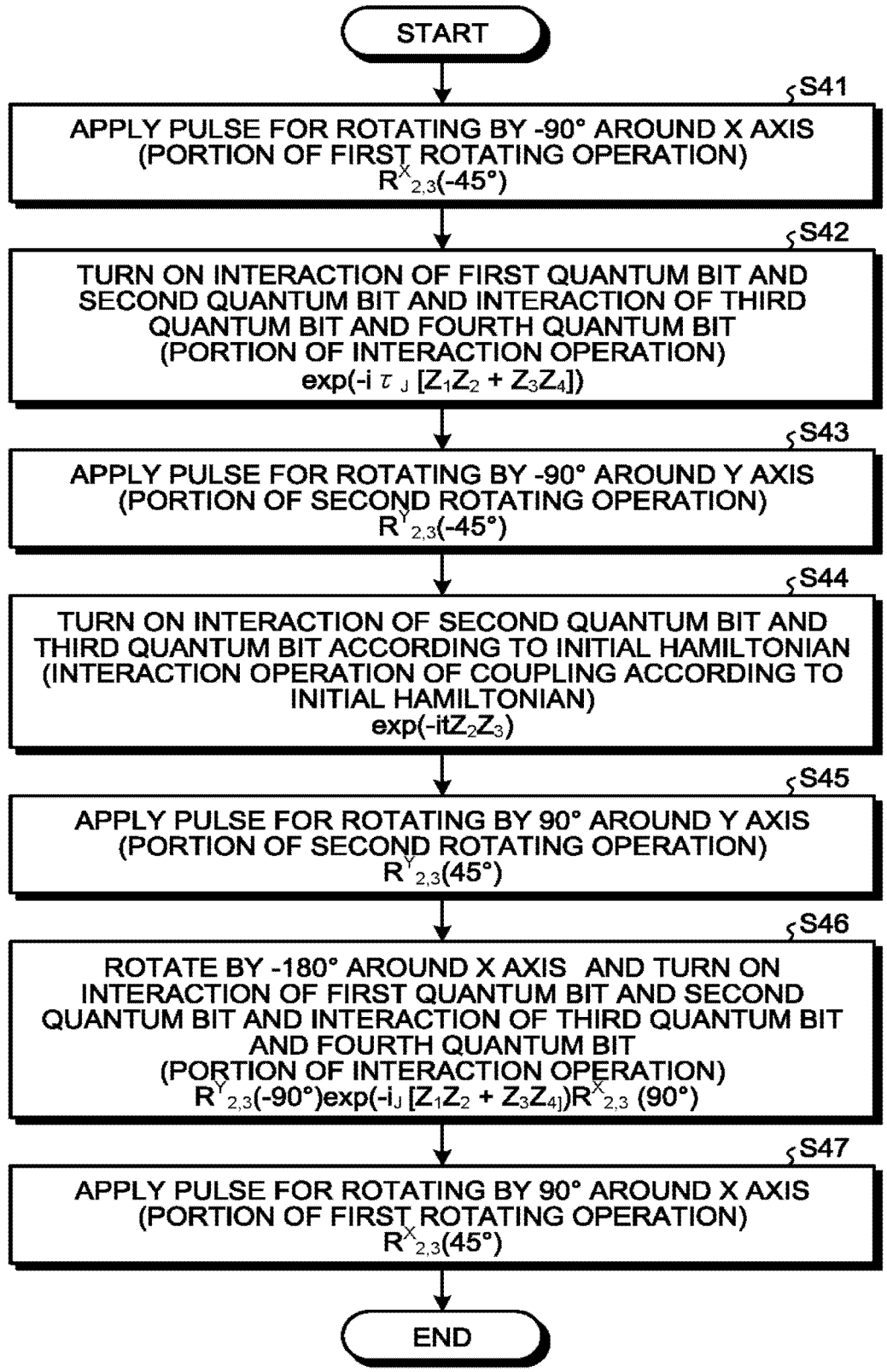
FIG. 7 is a diagram illustrating an example of operations in a time series by an operation unit.

FIG. 7 is a flowchart illustrating an example of operations in time series by the operation unit 30.

In the case of executing the first rotating operation (S21), the interaction operation (S22), and the second rotating operation (S23), the operation unit 30 applies a pulse or the like before and after the coupling according to the initial Hamiltonian between the second quantum bit 42 and the third quantum bit 43 is allowed to interact. This operation is expressed by a mathematical formula, as illustrated in the following Formula (21).

$$R_{2,3}^{X}(45°)R_{2,3}^{X}(-90°)e^{i\tau J[Z_1Z_2+Z_3Z_4]}R_{2,3}^{X}(90°)R_{2,3}^{Y}(45°) \times e^{-i t Z_2 Z_3} R_{2,3}^{Y}(-45°) e^{-i\tau J[Z_1Z_2+Z_3Z_4]} R_{2,3}^{X}(-45°) \quad (21)$$

In the Formula (21), $R_{2,3}^{\alpha}(\theta)$ indicates that the second quantum bit 42 and the third quantum bit 43 are rotated θ° around the α axis. Herein, α is X or Y.

In the case of executing the operation corresponding to the Formula (21), the operation unit 30 sequentially executes from a partial formula on the right side of the Formula (21) toward a partial formula on the left side. Specifically, the operation unit 30 executes the processing of S41 to S47 of FIG. 7 in time series.

First, in S41, the operation unit 30 applies a pulse for rotating each of the second quantum bit 42 and the third quantum bit 43 by −45° around the X axis. The processing of S41 corresponds to a portion of the processing of the first rotating operation (S21). By executing S41, the operation unit 30 can execute the processing corresponding to a partial formula of the following Formula (31).

$$R^{X}_{2,3}(-45°) \quad (31)$$

Subsequently, in S42, the operation unit 30 turns on the interaction between the first quantum bit 41 and the second quantum bit 42 for a time of $\tau_J=\pi/(4J)$. In addition, in S42, the operation unit 30 turns on the interaction between the third quantum bit 43 and the fourth quantum bit 44 for a time of $\tau_J=\pi/(4J)$. The processing of S42 corresponds to a portion of the processing of the interaction operation (S22). By executing S42, the operation unit 30 can execute the processing corresponding to a partial formula of the following Formula (32).

$$\exp(-i\tau_J[Z_1Z_2+Z_3Z_4]) \quad (32)$$

Subsequently, in S43, the operation unit 30 applies pulse for rotating each of the second quantum bit 42 and the third quantum bit 43 by −90° around the Y axis. The processing of S43 corresponds to a portion of the processing of the second rotating operation (S23). By executing S43, the operation unit 30 can execute the processing corresponding to a partial formula of the following Formula (33).

$$R^{Y}_{2,3}(-45°) \quad (33)$$

Subsequently, in S44, the operation unit 30 turns on the interaction of the coupling according to the initial Hamiltonian between the second quantum bit 42 and the third quantum bit 43 for a time of t. The processing of S44 corresponds to the processing of the interaction (S13) of the coupling according to the initial Hamiltonian. By executing S44, the operation unit 30 can execute the processing corresponding to a partial formula of the following Formula (34).

$$\exp(-itZ_2Z_3) \quad (34)$$

Subsequently, in S45, the operation unit 30 applies a pulse for rotating each of the second quantum bit 42 and the third quantum bit 43 by 90° around the Y axis. The processing of S45 corresponds to a portion of the processing of the second rotating operation (S23). By executing S45, the operation unit 30 can execute the processing corresponding to a partial formula of the following Formula (35).

$$R^Y_{2,3}(45°) \quad (35)$$

Subsequently, in S46, the operation unit 30 rotates by −180° around the X axis and turns on the interaction between the first quantum bit 41 and the second quantum bit 42 for a time of $\tau_J = \pi/(4J)$. In addition, the operation unit 30 rotates by −180° around the X axis and turns on the interaction between the third quantum bit 43 and the quantum bit 44 for a time of $\tau_J = \pi/(4J)$. The processing of S46 corresponds to a portion of the processing of the interaction operation (S22). By executing S46, the operation unit 30 can execute the processing corresponding to a partial formula of the following Formula (36).

$$R^X_{2,3}(-90°)\exp(-i\tau_J[Z_1Z_2+Z_3Z_4])R^X_{2,3}(90°) \quad (36)$$

Subsequently, in S47, the operation unit 30 applies pulse for rotating each of the second quantum bit 42 and the third quantum bit 43 by 90° around the X axis. The processing of S47 corresponds to a portion of the processing of the first rotating operation (S21). By executing S47, the operation unit 30 can execute the processing corresponding to a partial formula of the following Formula (37).

$$R^X_{2,3}(45°) \quad (37)$$

By executing the above processing in time series, the operation unit 30 can execute operations of the first rotating operation (S21), the interaction operation (S22), and the second rotating operation (S23) on the quantum calculation unit 20.

In Formula (21), both of $R^X_{2,3}(45°)$ and $R^X_{2,3}(-90°)$, which are the two leftmost partial formulas, are executed by rotating operation around the X axis. Therefore, the operation unit 30 may execute the operation expressed in the following Formula (22) which combines the two partial formulas.

$$R_{2,3}^X(-45°)e^{-i\tau_J[Z_1Z_2+Z_3Z_4]}R_{2,3}^X(90°)R_{2,3}^Y(45°)e^{-itZ_2Z_3}\times R_{2,3}^Y(-45°)e^{-i\tau_J[Z_1Z_2+Z_3Z_4]}R_{2,3}^X(-45°) \quad (22)$$

As described above, the quantum annealing apparatus 10 according to the first embodiment deforms the initial Hamiltonian including the interaction of two quantum bits to effective Hamiltonian including the interaction of four quantum bits and performs quantum calculation. Therefore, according to the quantum annealing apparatus 10, it is possible to easily execute optimization calculation using various Hamiltonians.

Second Embodiment

In a quantum annealing apparatus 10 according to a second embodiment, interaction $(Z_2Z_3)$ of two quantum bits among a plurality of quantum bits arranged in a matrix shape is effectively converted to interaction $(Z_1Z_2Z_3Z_4)$ of four quantum bits.

Figure 8:
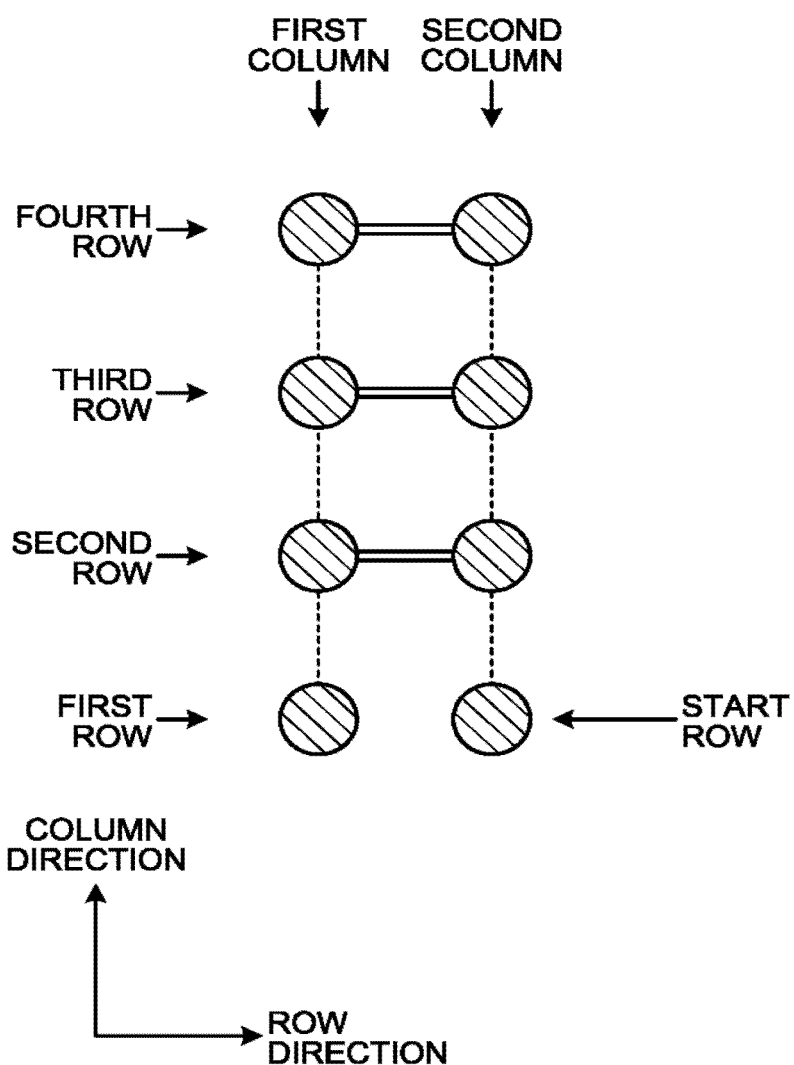
FIG. 8 is a diagram illustrating Hamiltonian of a plurality of quantum bits of a second embodiment.

FIG. 8 is a diagram illustrating a plurality of quantum bits included in a quantum calculation unit 20 of the quantum annealing apparatus 10 according to the second embodiment.

The quantum calculation unit 20 of the quantum annealing apparatus 10 according to the second embodiment is arranged in a matrix shape as illustrated in, for example, FIG. 8. In the example of FIG. 8, the quantum calculation unit 20 includes eight quantum bits arranged in a matrix shape of 4 rows×2 columns.

In the second embodiment, in the quantum calculation unit 20, quantum bits adjacent in the column direction are not coupled with each other. In addition, in the quantum calculation unit 20, quantum bits arranged in a predetermined start row (for example, the first row in FIG. 8) are not coupled with other quantum bits. However, in the quantum calculation unit 20, two quantum bits adjacent to each other in the row direction arranged in a row (for example, the second row, the third row, and the fourth row in FIG. 8) excluding the start row are coupled with each other with a strength set according to the initial Hamiltonian. In the quantum calculation unit 20, the interaction between the quantum bits adjacent in the column direction can be adjusted according to an operation from the outside. For example, the quantum calculation unit 20 includes a control quantum bit between the two quantum bits adjacent in the column direction.

Figure 9:
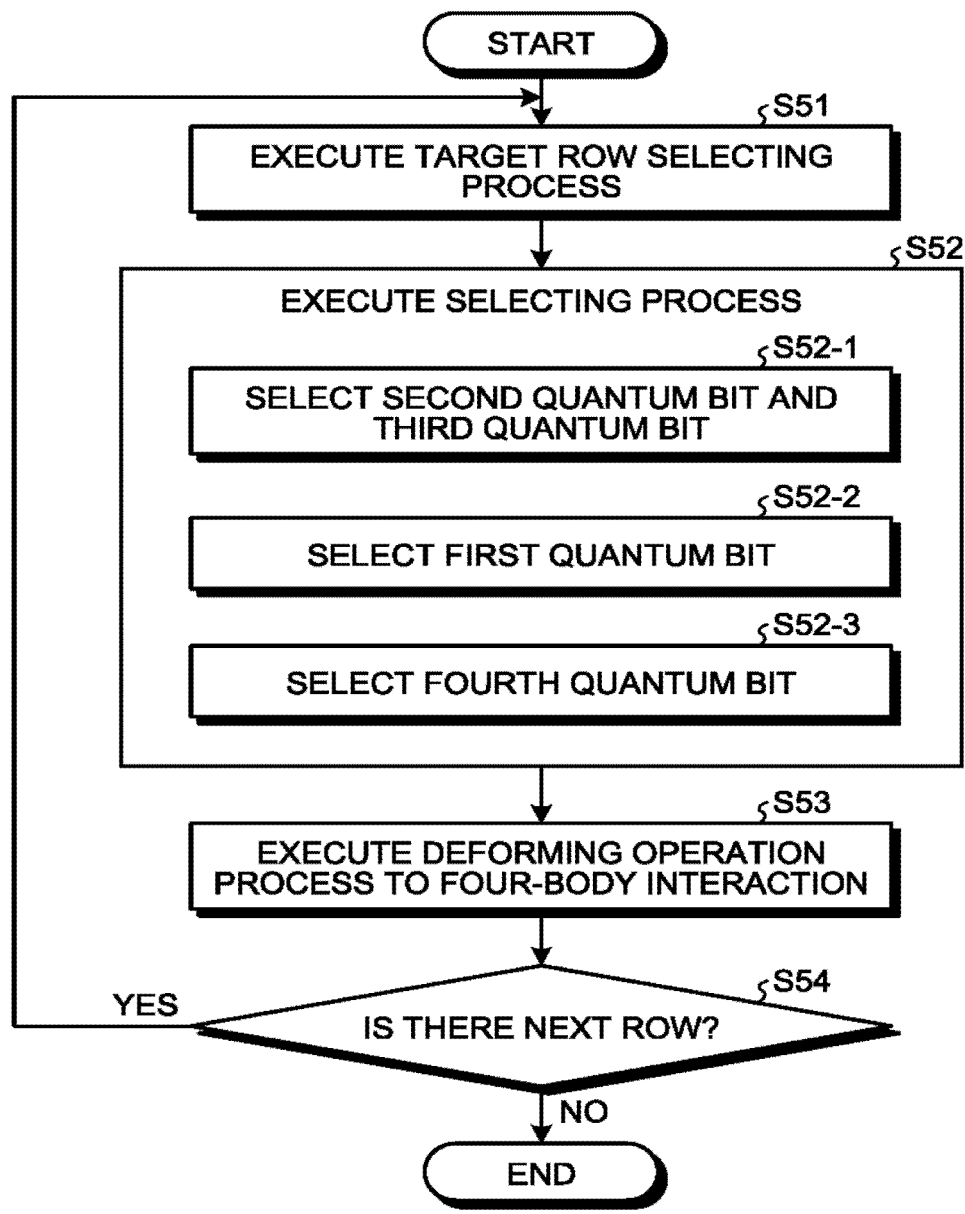
FIG. 9 is a diagram illustrating a flow of processes of an operation unit according to the second embodiment.

FIG. 9 is a flowchart illustrating a flow of processes of the operation unit 30 of the quantum annealing apparatus 10 according to the second embodiment.

First, in a target row selecting process (S51), the operation unit 30 selects one row in a matrix in which a plurality of quantum bits are arranged. In the first target row selecting process (S51), the operation unit 30 selects a row adjacent to the start row as a target row. In the second and subsequent target row selecting process (S51), the operation unit 30 selects a row that is adjacent to the immediately preceding target row and has not been selected as a target row so far as a target row.

Subsequently, in a selecting process (S52), the operation unit 30 selects a set including a first quantum bit 41, a second quantum bit 42, a third quantum bit 43, and a fourth quantum bit 44.

More specifically, the operation unit 30 selects two quantum bits coupled in the row direction according to the initial Hamiltonian included in the target row as the second quantum bit 42 and the third quantum bit 43 (S52-1).

Subsequently, the operation unit 30 selects, as the first quantum bit 41, the quantum bit which is included in the target row selected immediately before and is adjacent to the second quantum bit 42 in the column direction (S52-2). In addition, in the case of the first selecting process (S52), the operation unit 30 selects, as the first quantum bit 41, the quantum which is included in the start row and is adjacent to the second quantum bit 42 in the column direction (S52-1).

Subsequently, the operation unit 30 selects, as the fourth quantum bit 44, the quantum bit which is included in the target row selected immediately before and is adjacent to the third quantum bit 43 in the column direction (S52-3). In addition, in the case of the first selecting process (S52), the operation unit 30 selects, as the first quantum bit 41, the quantum bit which is included in the start row and is adjacent to the third quantum bit 43 in the column direction (S52-3).

Subsequently, in the deforming operation process (S53), the operation unit 30 executes the first rotating operation (S21), the interaction operation (S22), and the second rotating operation (S23) on the selected set.

Subsequently, the operation unit 30 determines whether or not there is a next selectable row (S54). For example, in a case where a row that has not been selected as a target row is selected as a target row, the operation unit 30 determines whether or not there is a row from which a set including the first quantum bit 41, the second quantum bit 42, the third quantum bit 43, and the fourth quantum bit 44 is selectable.

If there is a next selectable row (Yes in S54), the operation unit 30 returns the processing to S51 and repeats the processing from S51. If there is no next selectable row (No in S54), the operation unit 30 ends the processes of this flow.

Ac described above, in a case where a plurality of quantum bits are arranged in a matrix shape, the operation unit 30 according to the second embodiment executes the selecting process (S52) and the deforming operation process (S53) every time the target row selecting process (S51) is executed. That is, each time the target row is selected, operation unit 30 executes the selecting process (S52), the first rotating operation (S21), the interaction operation (S22), and the second rotating operation (S23).

Hereinafter, a specific example in a case where the processes according to the second embodiment are executed on eight quantum bits arranged in a matrix shape of 4 rows×2 columns will be described with reference to FIGS. 10 to 14.

Figure 10:
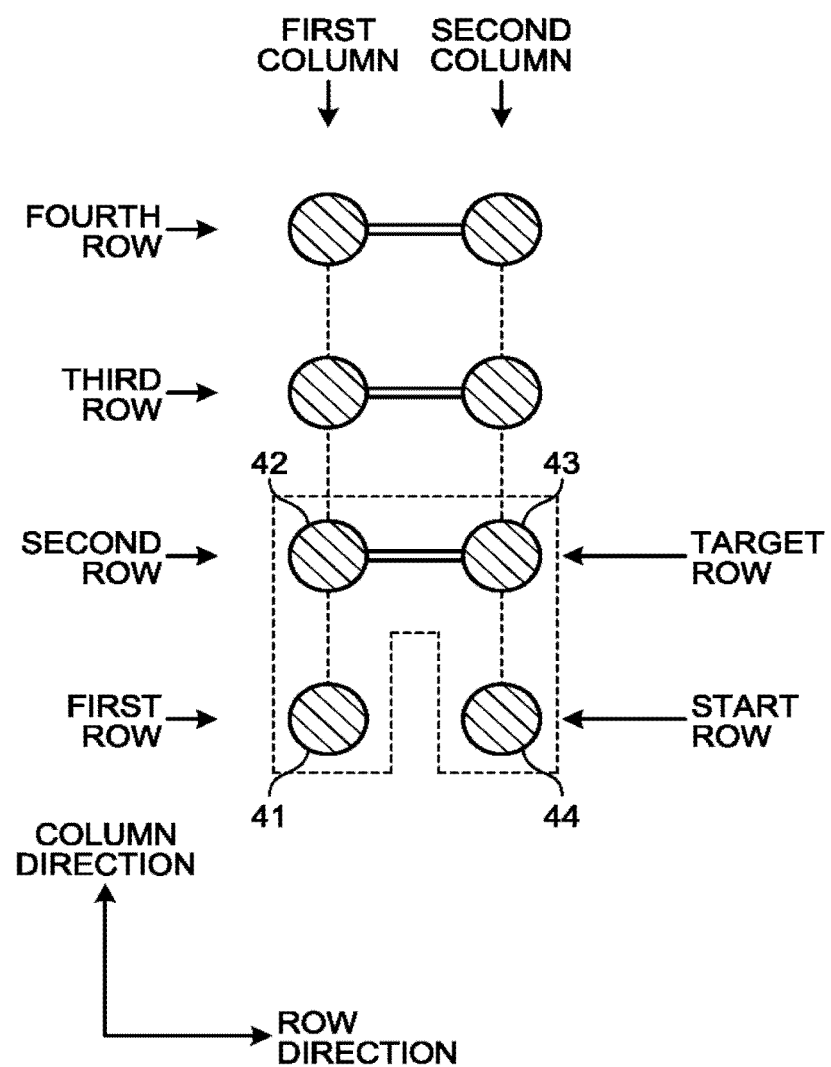
FIG. 10 is a diagram illustrating a state in which a second row of eight quantum bits is selected as a target row.

FIG. 10 is a diagram illustrating a selection example in a state in which the second row of eight quantum bits arranged in a matrix shape of 4 rows×2 columns is selected as a target row.

First, the operation unit 30 selects the second row adjacent to the first row which is the start row as a target row. In this case, the operation unit 30 selects a set including the quantum bits as illustrated in FIG. 10.

Figure 11:
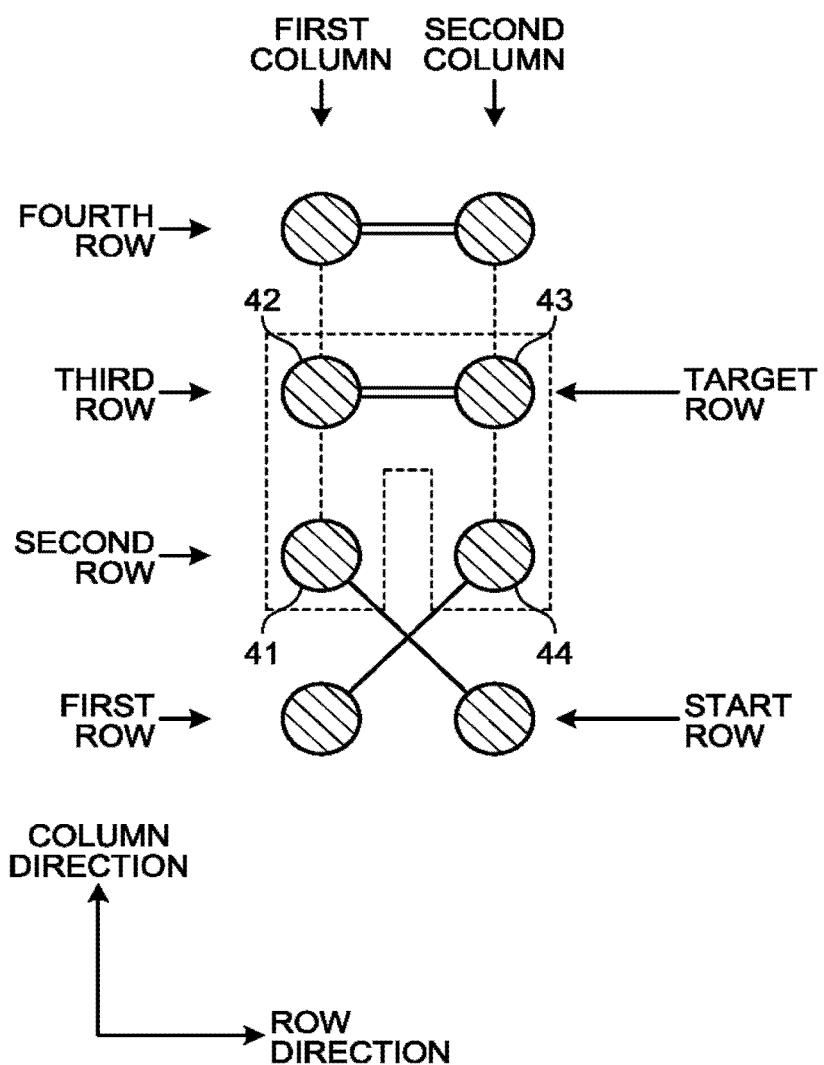
FIG. 11 is a diagram illustrating a state in which a third row of eight quantum bits is selected as a target row.

FIG. 11 is a diagram illustrating a selection example in a state in which the third row of eight quantum bits arranged in a matrix shape of 4 rows×2 columns is selected as a target row.

The operation unit 30 executes the converting process of four-body interaction on the set obtained by selecting the second row as a target row. As a result, as illustrated in FIG. 11, the Hamiltonian of the set obtained by selecting the second row as a target row is effectively converted to Hamiltonian in which four bodies are coupled.

The operation unit 30 sets the second row as a target row and, after that, selects the third row as a target row. In this case, the operation unit 30 selects a set including the quantum bits as illustrated in FIG. 11.

Figure 12:
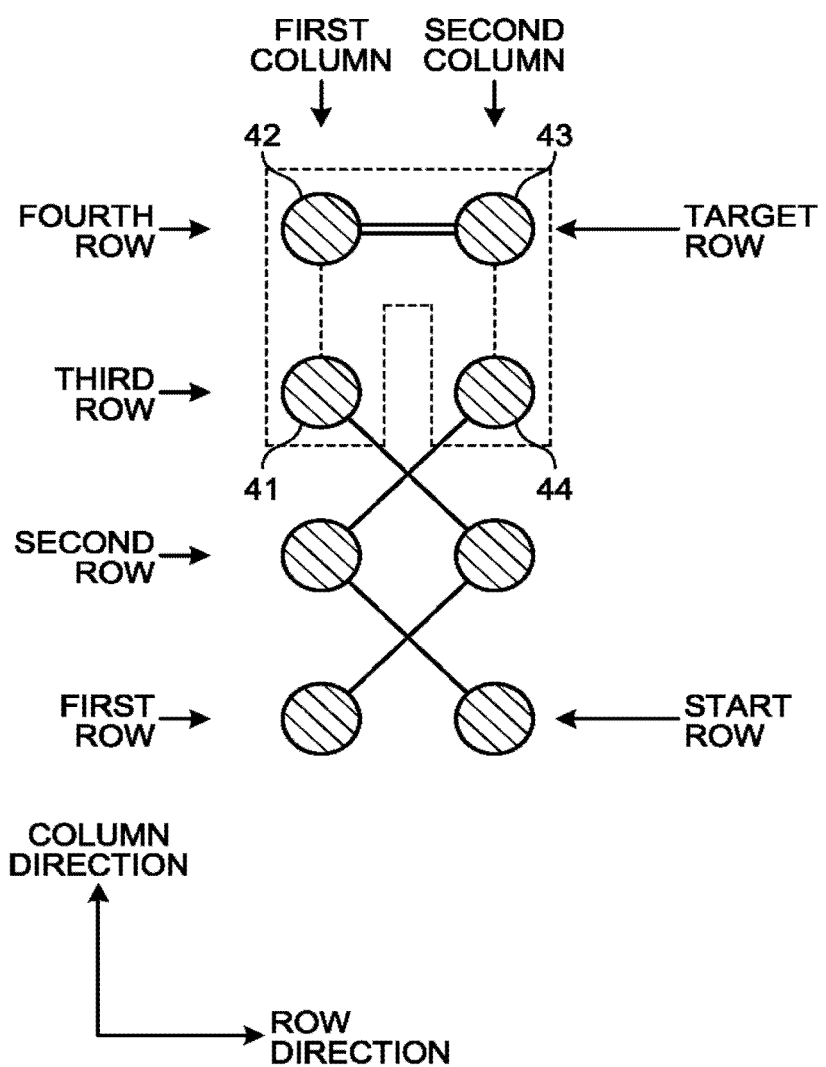
FIG. 12 is a diagram illustrating a state in which a fourth row of eight quantum bits is selected as a target row.

FIG. 12 is a diagram illustrating a selection example in a state in which a fourth row of the eight quantum bits arranged in a matrix shape of 4 rows×2 columns is selected as a target row.

The operation unit 30 executes the converting process of four-body interaction on the set obtained by selecting the third row as a target row. As a result, as illustrated in FIG. 12, Hamiltonian of the set obtained by selecting the third row as a target row is effectively converted to Hamiltonian in which four bodies are coupled.

The operation unit 30 sets the third row as a target row and, after that, selects the fourth row as a target row. In this case, the operation unit 30 selects a set including the quantum bits as illustrated in FIG. 12.

Figure 13:
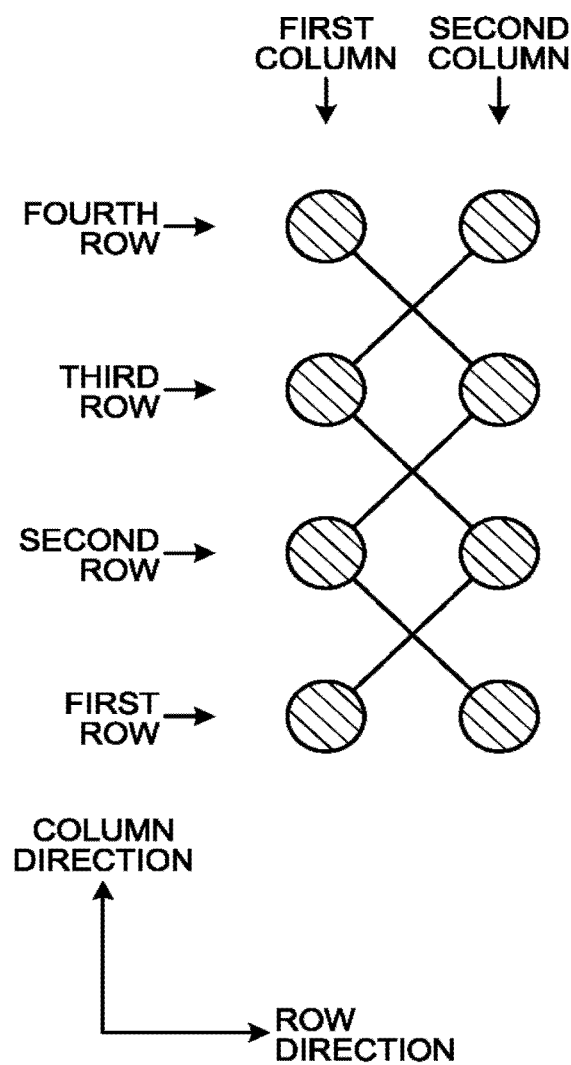
FIG. 13 is a diagram illustrating effective Hamiltonian after processes according to the second embodiment.

FIG. 13 is a diagram illustrating effective Hamiltonian after the processes according to the second embodiment are executed on the eight quantum bits arranged in a matrix shape of 4 rows×2 columns.

The operation unit 30 executes the converting process of four-body interaction on the set obtained by selecting the third row as a target row. As a result, as illustrated in FIG. 13, the Hamiltonian of the set obtained by selecting the fourth row as a target row is effectively converted to Hamiltonian in which four bodies are coupled.

As described above, according to the quantum annealing apparatus 10 according to the second embodiment, each of the interaction ($Z_2 Z_3$) of two quantum bits of a plurality of sets included in a plurality of quantum bits arranged in a matrix shape can be effectively converted to the interaction ($Z_1 Z_2 Z_3 Z_4$) of four quantum bits.

Third Embodiment

In a quantum annealing apparatus 10 according to a third embodiment, interaction ($Z_2 Z_3$) of two quantum bits among a plurality of quantum bits arranged in a matrix shape including three or more rows is effectively converted to interaction ($Z_1 Z_2 Z_3 Z_4$) of four quantum bits.

Figure 14:
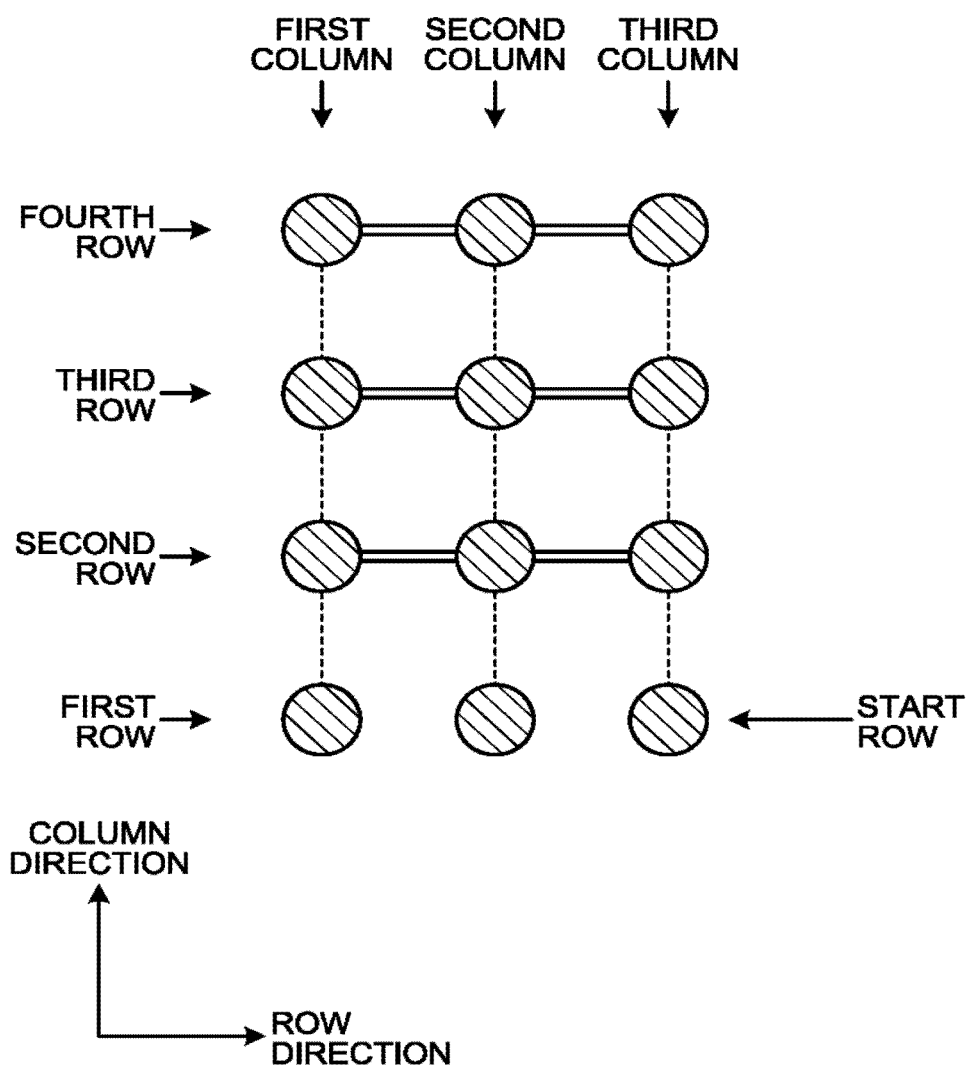
FIG. 14 is a diagram illustrating Hamiltonian of a plurality of quantum bits of a third embodiment.

FIG. 14 is a diagram illustrating a plurality of quantum bits included in the quantum calculation unit 20 of the quantum annealing apparatus 10 according to the third embodiment.

The quantum calculation unit 20 of the quantum annealing apparatus 10 according to the third embodiment is arranged in a matrix shape as illustrated in, for example, FIG. 14. In the example of FIG. 14, the quantum calculation unit 20 includes twelve quantum bits arranged in a matrix shape of 4 rows×3 columns. In addition, the third embodiment is different from the second embodiment in that the plurality of quantum bits according to the third embodiment are arranged in a matrix shape including three or more quantum bits in one row.

In addition, in the third embodiment, in the quantum calculation unit 20, the quantum bits are coupled under the conditions similar to those of the second embodiment.

Figure 15:
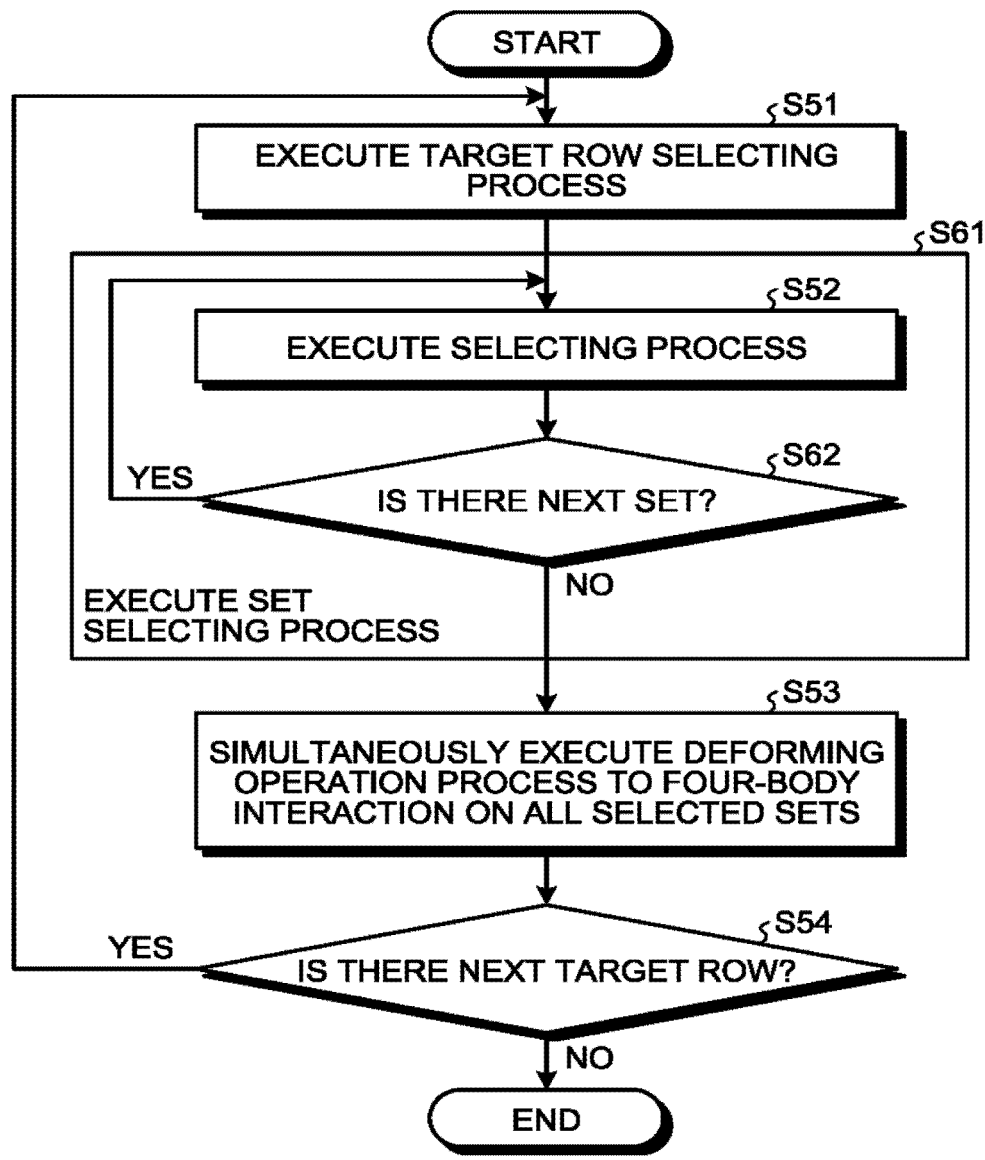
FIG. 15 is a diagram illustrating a flow of processes of the operation unit according to the third embodiment.

FIG. 15 is a flowchart illustrating a flow of processes of the operation unit 30 of the quantum annealing apparatus 10 according to the third embodiment. Since the processing of the operation unit 30 according to the third embodiment is substantially the same as that of the second embodiment, the same processing is denoted by the same step number, and a detailed description thereof will be omitted.

The operation unit 30 according to the third embodiment executes a set selecting process (S61) subsequently to the target row selecting process (S51). In the set selecting process (S61), the operation unit 30 selects one set or a plurality of sets.

For example, after executing the selecting process (S52) once, the operation unit 30 determines whether or not there is a next selectable set in S62. For example, the operation unit 30 determines whether or not there are two quantum bits, which have not been selected as a set and are connected in the row direction, in the target row. If there is a next selectable set (Yes in S62), the operation unit 30 returns the processing to S52 and repeats the process of S52. If there is no next selectable set (No in S62), the operation unit 30 advances the processing to the deforming operation process (S53). As a result, the operation unit 30 can select a plurality of sets each time a target row is selected.

Subsequently, in the deforming operation process (S53), the operation unit 30 simultaneously executes the first rotating operation (S21), the interaction operation (S22), and the second rotating operation (S23) on all the selected sets. More specifically, the operation unit 30 simultaneously executes the first rotating operation on the selected plurality of sets. In addition, the operation unit 30 simultaneously executes the interaction operation (S22) on the selected plurality of sets. In addition, the operation unit 30 simultaneously executes the second rotating operation (S23) on the selected plurality of sets.

As described above, in a case where a plurality of quantum bits are arranged in a matrix shape, the operation unit 30 according to the third embodiment executes the selecting process (S52) and the deforming operation process (S53) every time the target row selecting process (S51) is executed. Furthermore, in a case where a plurality of sets are selected for the target row, the operation unit 30 according to the third embodiment simultaneously executes the deforming operation process (S53) on the selected plurality of sets.

Next, a specific example in a case where the processes according to the flow illustrated in FIG. 15 are executed on twelve quantum bits arranged in a matrix shape of 4 rows×3 columns is described with reference to FIGS. 16 to 19.

Figure 16:
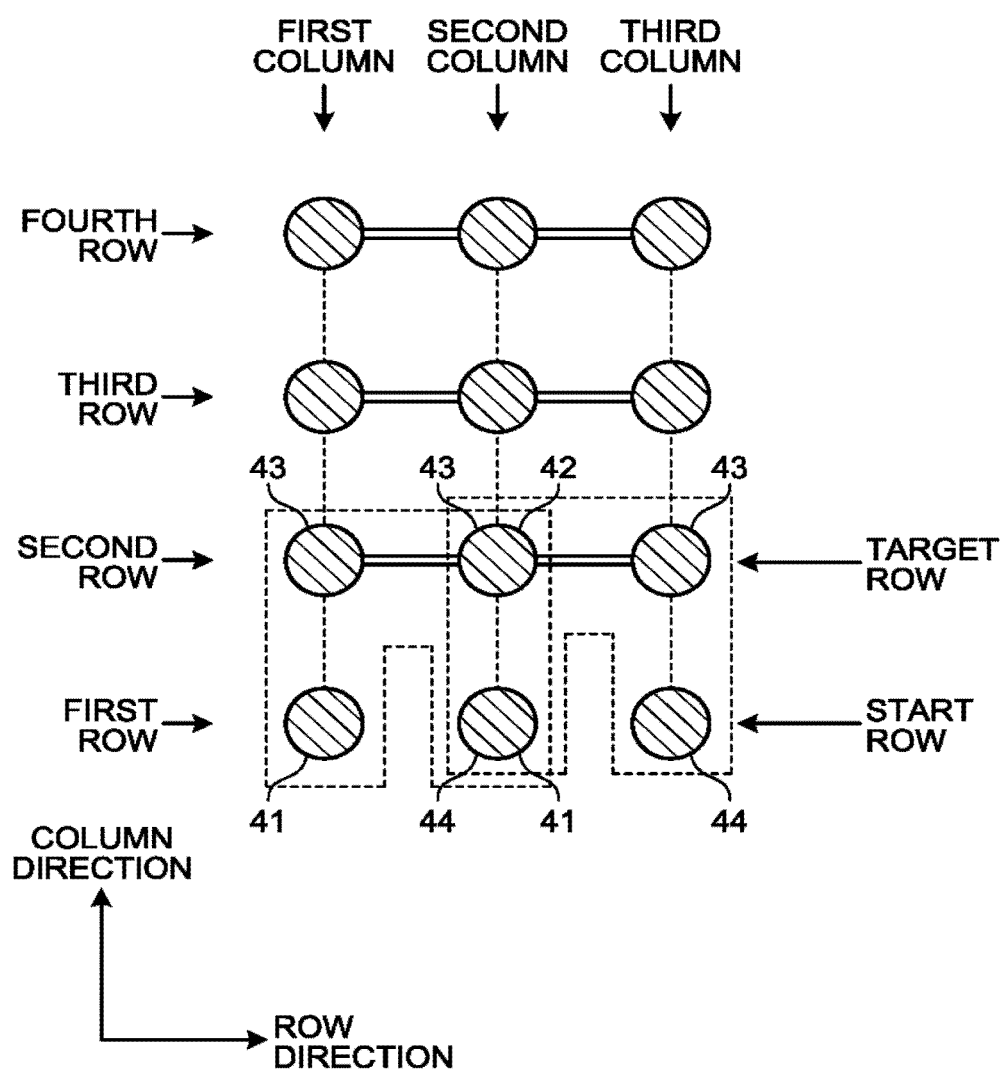
FIG. 16 is a diagram illustrating a state in which a second row of twelve quantum bits is selected as a target row.

FIG. 16 is a diagram illustrating a selection example in a state in which the second row of twelve quantum bits arranged in a matrix shape of 4 rows×3 columns is selected as a target row.

First, the operation unit 30 selects the second row adjacent to the start row as a target row. In this case, the operation unit 30 selects two sets as illustrated in FIG. 16.

Herein, in some cases, the first quantum bits 41 in a set may be the same as the fourth quantum bits 44 in another set. However, the operation unit 30 simultaneously executes the first rotating operation (S21) on a plurality of sets.

Therefore, the operation unit 30 can prevent the first rotating operation (S21) from being executed twice for the same quantum bits. In addition, the operation unit 30 simultaneously executes the second rotating operation (S23) on a plurality of sets. Therefore, the operation unit 30 can prevent the second rotating operation (S23) from being executed twice for the same quantum bits.

In addition, in some cases, the pair of the first quantum bit 41 and the second quantum bit 42 in a set may be the same as the pair of the third quantum bit 43 and the fourth quantum bit 44 in another set. However, the operation unit 30 simultaneously executes the interaction operation (S22) on a plurality of sets. Therefore, the operation unit 30 can prevent the interaction operation (S22) from being executed twice for a pair of the same quantum bits.

Figure 17:
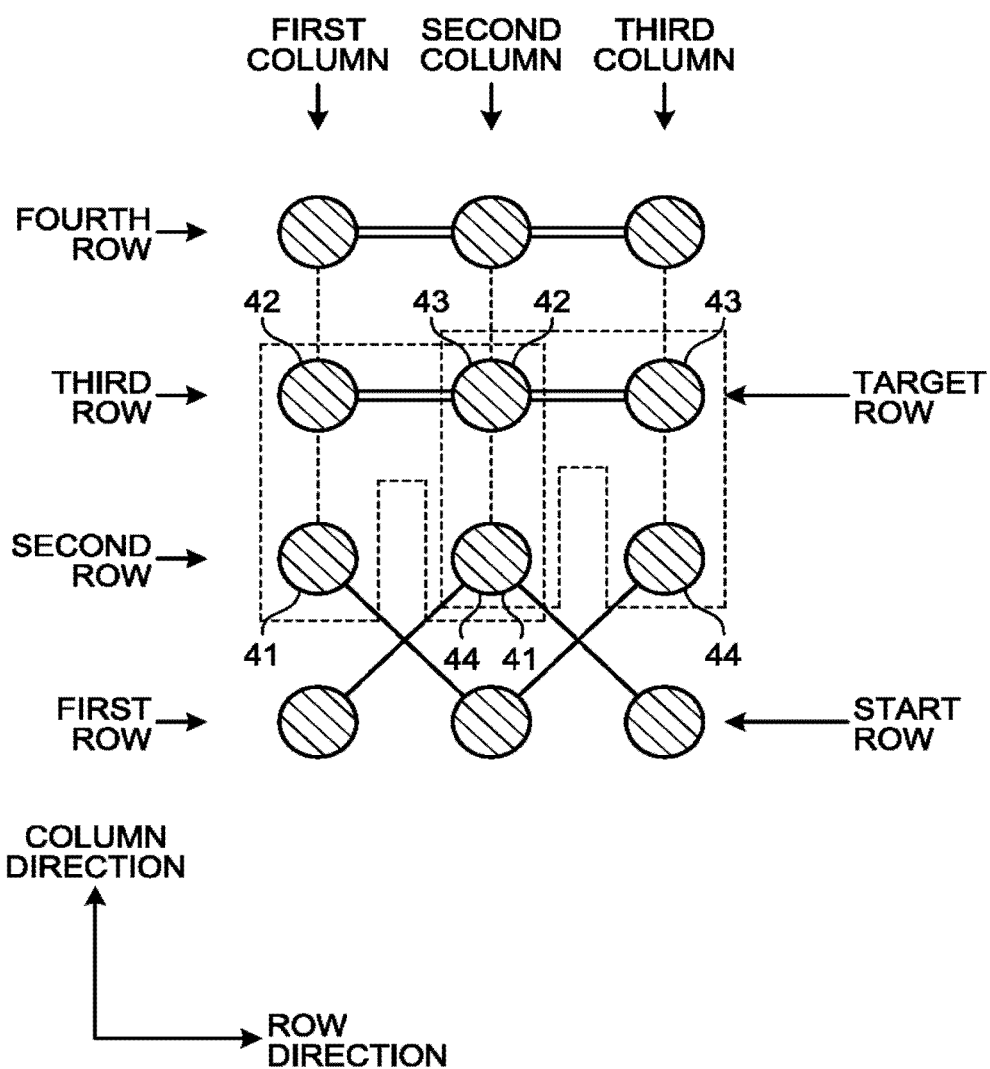
FIG. 17 is a diagram illustrating a state in which a third row of twelve quantum bits is selected as a target row.

FIG. 17 is a diagram illustrating a selection example in a state in which the third row of twelve quantum bits arranged in a matrix shape of 4 rows×3 columns is selected as a target row.

The operation unit 30 simultaneously executes the converting process of four-body interaction on the two sets obtained by selecting the second row as a target rows. As a result, as illustrated in FIG. 17, the Hamiltonian of each of the two sets obtained by selecting the second row as a target row is effectively converted to Hamiltonian in which four bodies are coupled.

The operation unit 30 sets the second row as a target row and, after that, selects the third row as a target row. In this case, the operation unit 30 selects two sets as illustrated in FIG. 17.

Figure 18:
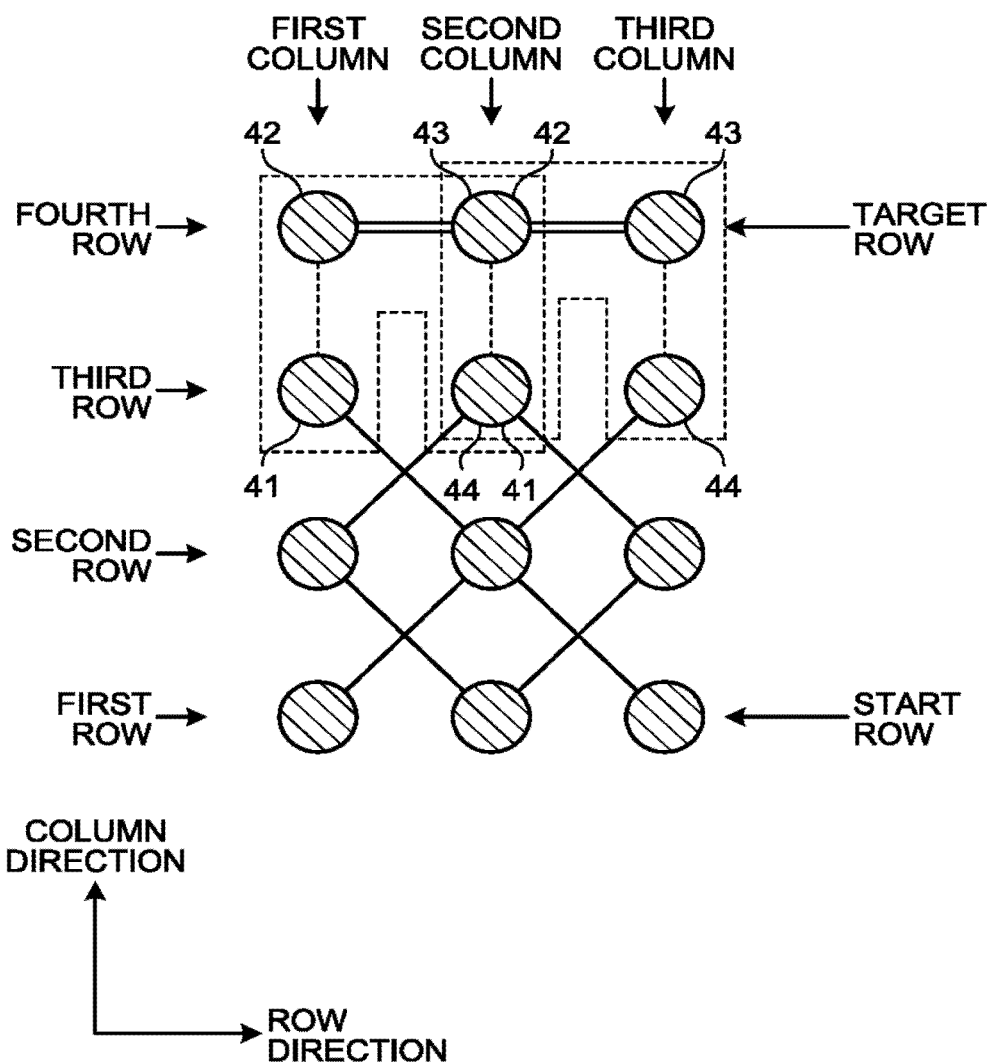
FIG. 18 is a diagram illustrating a state in which a fourth row of twelve quantum bits is selected as a target row.

FIG. 18 is a diagram illustrating a selection example in a state in which the fourth row of twelve quantum bits arranged in a matrix shape of 4 rows×3 columns is selected as a target row.

The operation unit 30 simultaneously executes the converting process of four-body interaction on the two sets obtained by selecting the third row as a target row. As result, as illustrated in FIG. 18, the Hamiltonian of each of the two sets obtained by selecting the third row as a target row is effectively converted to Hamiltonian in which four bodies are coupled.

The operation unit 30 sets the third row as a target row and, after that, selects the fourth row as a target row. In this case, the operation unit 30 selects two sets as illustrated in FIG. 18.

Figure 19:
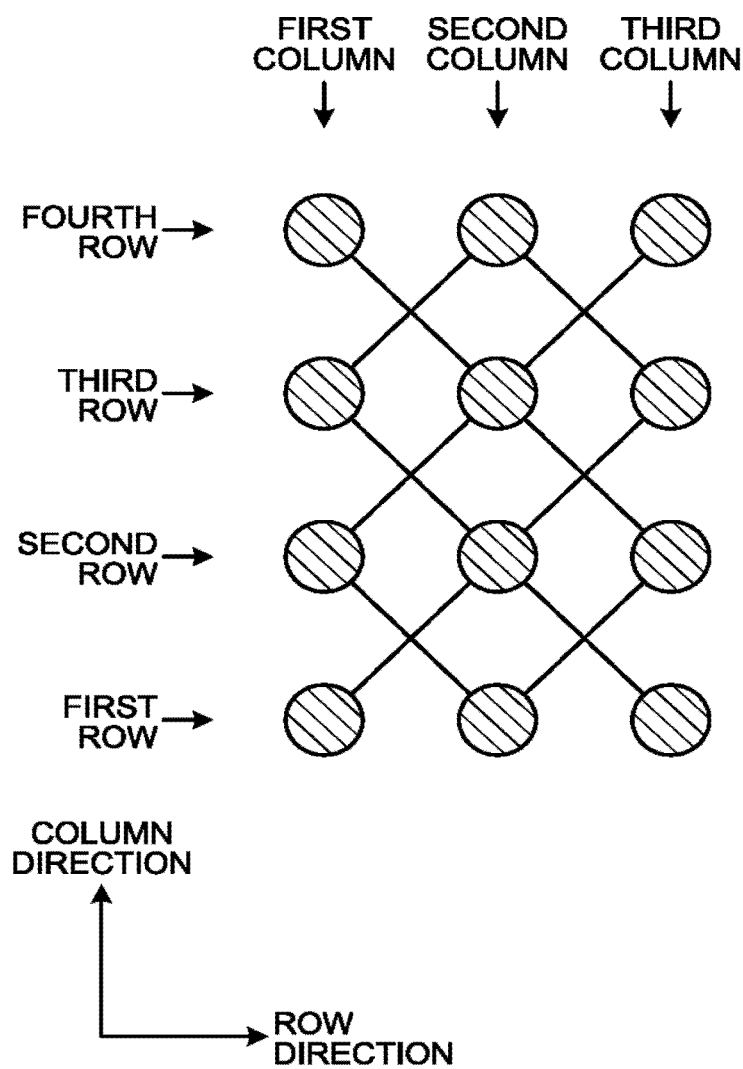
FIG. 19 is a diagram illustrating effective Hamiltonian after processes according to the third embodiment.

FIG. 19 is a diagram illustrating effective Hamiltonian after the processes according to the third embodiment are executed on the twelve quantum bits arranged in a matrix shape of 4 rows×3 columns.

The operation unit 30 simultaneously executes converting process of four-body interaction on the two sets obtained by selecting the fourth row as a target row. As a result, the Hamiltonian of each of the two sets obtained by selecting the fourth row as a target row is effectively converted to Hamiltonian in which four bodies are coupled, as illustrated in FIG. 19.

As described above, according to the quantum annealing apparatus 10 of the third embodiment, the interaction $(Z_2 Z_3)$ of two quantum bits among a plurality of quantum bits arranged in a matrix shape is effectively converted to the interaction $(Z_1 Z_2 Z_3 Z_4)$ of four quantum bits. Furthermore, according to the quantum annealing apparatus 10 according to the third embodiment, it is possible to simultaneously execute the deforming operation process on a plurality of sets.

Fourth Embodiment

In a quantum annealing apparatus 10 according to a fourth embodiment, interaction $(Z_2 Z_3)$ of two quantum bits among a plurality of quantum bits arranged in a portion of a matrix shape is effectively converted to interaction $(Z_1 Z_2 Z_3 Z_4)$ of four quantum bits.

Figure 20:
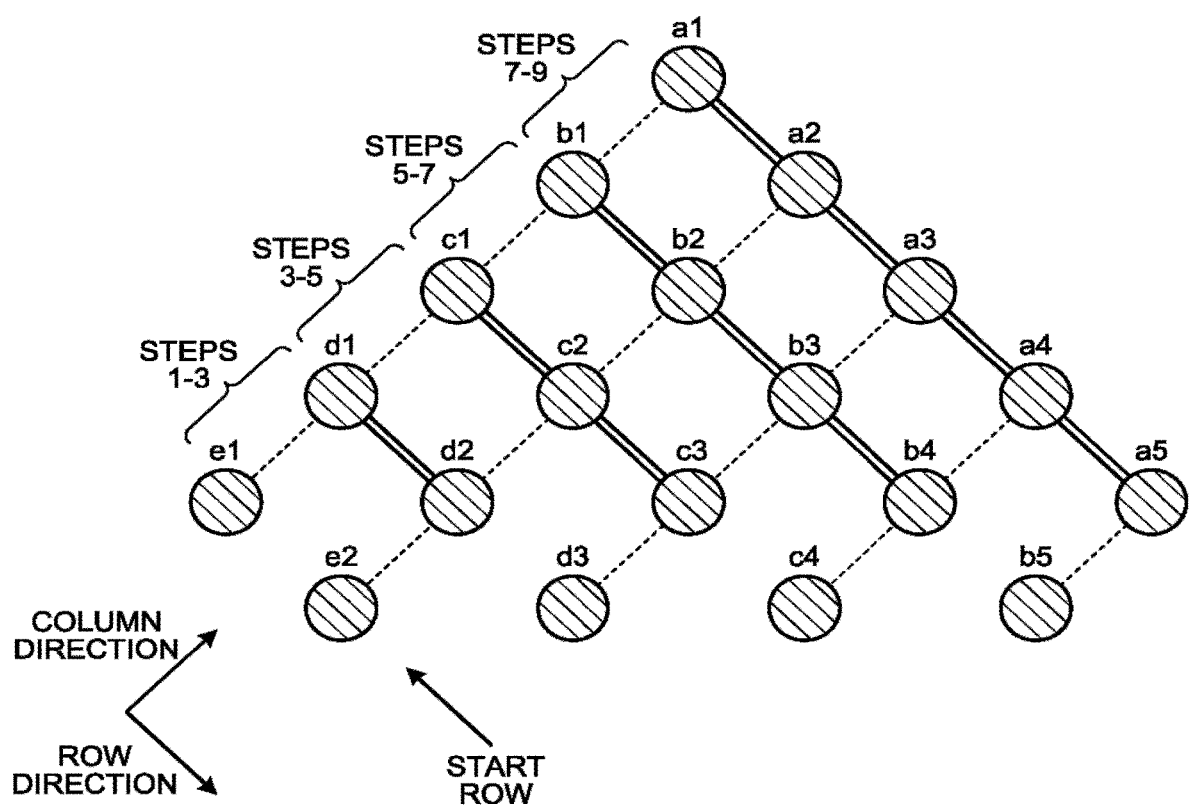
FIG. 20 is a diagram illustrating Hamiltonian of a plurality of quantum bits of a fourth embodiment.

FIG. 20 is a diagram illustrating Hamiltonian of a plurality of quantum bits included in a quantum calculation unit 20 of the quantum annealing apparatus 10 according to the fourth embodiment.

As illustrated in FIG. 20, for example, the quantum calculation unit 20 of the quantum annealing apparatus 10 according to the fourth embodiment includes a plurality of quantum bits arranged in a range excluding a triangular area including one vertex in the matrix shape.

The arrangement of the quantum bits in FIG. 20 corresponds to the arrangement of the quantum bits described in W. Lechner, P. Hauke and P. Zoller, "A quantum annealing architecture with all-to-all connectivity from local interaction", Science Advances Vol. 1, no. 9, e1500838, (2015). Specifically, the matrix of FIG. 20 includes five rows of an a-th row, a b-th row, a c-th row, a d-th row, and an e-th row. In addition, the matrix of FIG. 20 includes five columns of a first column, a second column, a third column, a fourth column, and a fifth column.

In addition, in the example of FIG. 20, the plurality of quantum bits are arranged in a range excluding a triangular area including a triangular area including one vertex (triangular area with three bases and three heights) among a matrix of 5 rows×5 columns. More specifically, the plurality of quantum bits are arranged in a range excluding the e-th row×the third column, the e-th row×the fourth column, the e-th row×the fifth column, the d-th row×the fourth column, the d-th row×the fifth column, and the c-th row×the fifth column.

In addition, among the plurality of quantum bits illustrated in FIG. 20, four quantum bits arranged in the e-th row×the second column, the d-th row×the third column, the c-th row×the fourth column, and the b-th row×the fifth column are fixed values.

In addition, in the quantum calculation unit 20, the quantum bits having fixed values and the other quantum bits are not coupled. For other cases, in the quantum calculation unit 20, the quantum bits are coupled under the conditions similar to those of the second embodiment.

In addition, in the example illustrated in FIG. 20, the e-th row is set as the start row.

FIG. 21 is a diagram illustrating an example of operations by the operation unit 30 according to the fourth embodiment. In the fourth embodiment, the operation unit 30 executes the processing in the procedure illustrated in FIG. 21, for example.

At start, Hamiltonian ($H_{tgt}$) is as follows.

$$H_{tgt} = Z_{a1}Z_{a2} + Z_{a2}Z_{a3} + Z_{a3}Z_{a4} + Z_{a4}Z_{a5} +$$
$$Z_{b1}Z_{b2} + Z_{b2}Z_{b3} + Z_{b3}Z_{b4} + Z_{c1}Z_{c2} + Z_{c2}Z_{c3} + Z_{d1}Z_{d2}$$

First, in step 1, the operation unit 30 executes the first rotating operation (S21) on the quantum bit of the d-th row. Subsequently, in step 2, the operation unit 30 executes the interaction operation (S22) on the pair of the quantum hit of the e-th row and the quantum bit of the d-th row. Subsequently, in step 3, the operation unit 30 executes the second rotating operation (S23) on the quantum bit of the d-th row.

In addition, in step 3, the operation unit 30 also executes the first rotating operation (S21) on the quantum bit of the c-th row in parallel. Subsequently, in step 4, the operation unit 30 executes the interaction operation (S22) on the pair of the quantum bit of the d-th row and the quantum bit of the c-th row. Subsequently, in step 5, the operation unit 30 executes the second rotating operation (S23) on the quantum bit of the c-th row.

Furthermore, in step 5, the operation unit 30 also executes the first rotating operation (S21) on the quantum bit of the b-th row in parallel. Subsequently, in step 6, the operation unit 30 executes the interaction operation (S22) on the pair of the quantum bit of the c-th row and the quantum bit of the b-th row. Subsequently, in step 7, the operation unit 30 executes the second rotating operation (S23) on the quantum bit of the b-th row.

In addition, in step 7, the operation unit 30 also executes the first rotating operation (S21) on the quantum bit of the a-th row in parallel. Subsequently, in step 8, the operation unit 30 executes the interaction operation (S22) on the pair of the quantum bit of the b-th row and the quantum bit of the a-th row. Subsequently, in step 9, the operation unit 30 executes the second rotating operation (S23) on the quantum bits of the a-th row.

Figure 22:
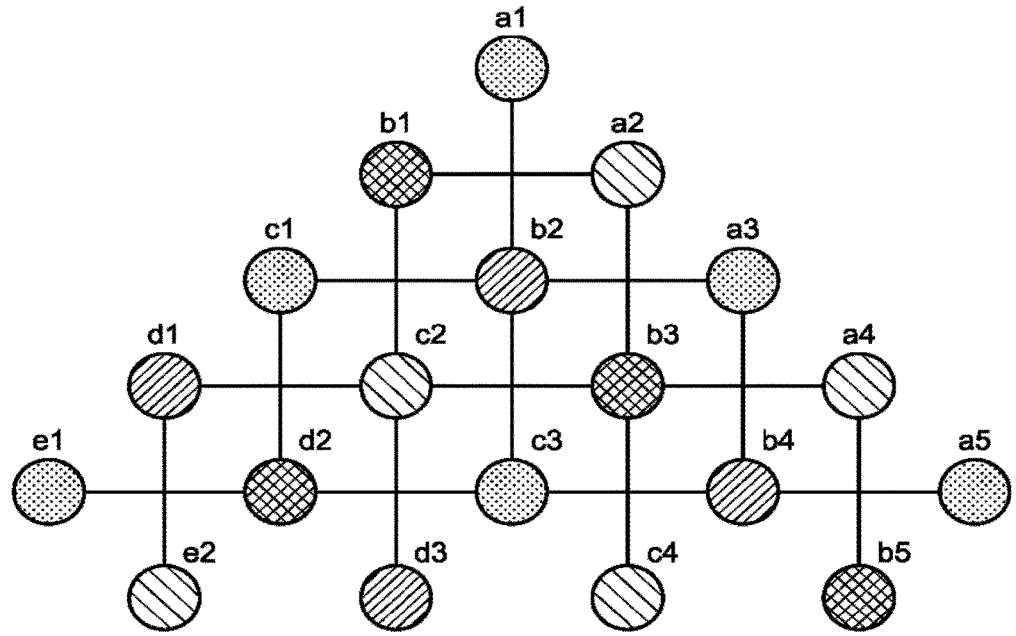
FIG. 22 is a diagram illustrating Hamiltonian after conversion by the operation unit according to the fourth embodiment.

FIG. 22 is a diagram illustrating effective Hamiltonian after the initial Hamiltonian illustrated in FIG. 20 is converted by the procedure illustrated in FIG. 21. In a case where the operation unit 30 executes the processing in the procedure illustrated in FIG. 21, the effective Hamiltonian is as illustrated in FIG. 22.

The effective Hamiltonian illustrated in FIG. 22 is expressed as follows.

$$H_{tgt} = Z_{a1}Z_{a2}Z_{b1}Z_{b2} + Z_{a2}Z_{a3}Z_{b2}Z_{b3} + Z_{a3}Z_{a4}Z_{b3}Z_{b4} +$$
$$Z_{a4}Z_{a5}Z_{b4}Z_{b5} + Z_{b1}Z_{b2}Z_{c1}Z_{c2} + Z_{b2}Z_{b3}Z_{c2}Z_{c3} +$$
$$Z_{b3}Z_{b4}Z_{c3}Z_{c4} + Z_{c1}Z_{c2}Z_{d1}Z_{d2} + Z_{c2}Z_{c3}Z_{d2}Z_{d3} + Z_{d1}Z_{d2}Z_{e1}Z_{e2}$$

As described above, according to the quantum annealing apparatus 10 according to the fourth embodiment, with respect to a plurality of quantum bits arranged in a portion of the matrix, it is possible to effectively convert the interaction ($Z_2Z_3$) of two quantum bits to the interaction ($Z_1Z_2Z_3Z_4$) of four quantum bits. Furthermore, according to the quantum annealing apparatus 10 of the fourth embodiment, it is possible to simultaneously execute the deforming operation process on a plurality of sets.

Figure 23:
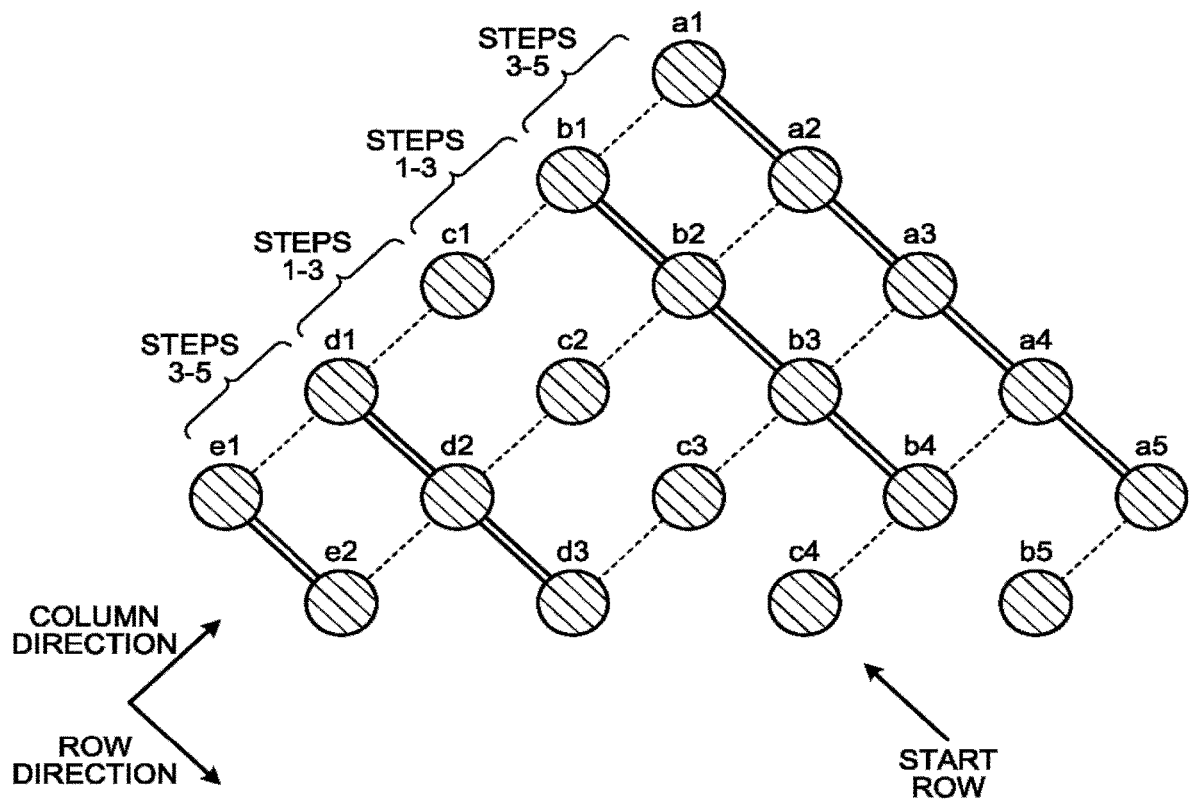
FIG. 23 is a diagram illustrating Hamiltonian of a plurality of quantum bits of the fourth embodiment.

FIG. 23 is a diagram illustrating Hamiltonian of a plurality of quantum bits included in the quantum calculation unit 20 of the quantum annealing apparatus 10 according to Modified Example of the fourth embodiment. In the quantum calculation unit 20 of the quantum annealing apparatus 10 according to the fourth embodiment, initial Hamiltonian is set as illustrated in FIG. 23.

The arrangement of a plurality of quantum bits illustrated in FIG. 23 is the same as the arrangement of the quantum bits illustrated in FIG. 20. However, the configuration of the initial Hamiltonian illustrated in FIG. 23 is different from the configuration of the initial Hamiltonian illustrated in FIG. 20.

Specifically, in Modified Example, in the quantum calculation unit 20, the row directions of the quantum bits arranged in the c-th row are not coupled. In Modified Example, in the quantum calculation unit 20, all three quantum bits of the d-th row are coupled in the row direction. In Modified Example, in the quantum calculation unit 20, the two quantum bits of the e-th row are coupled. In addition, in Modification Example, in the quantum calculation unit 20, the c-th row is set as the start row.

FIG. 24 is a diagram illustrating an example of operations by the operation unit 30 according to Modified Example of the fourth embodiment. In Modified Example of the fourth embodiment, the operation unit 30 executes the processing in the procedure illustrated in, for example, FIG. 24.

At start, Hamiltonian ($H_{tgt}$) is follows.

$$H_{tgt} = Z_{a1}Z_{a2} + Z_{a2}Z_{a3} + Z_{a3}Z_{a4} + Z_{a4}Z_{a5} +$$
$$Z_{b1}Z_{b2} + Z_{b2}Z_{b3} + Z_{b3}Z_{b4} + Z_{d1}Z_{d2} + Z_{d2}Z_{d3} + Z_{e1}Z_{e2}$$

First, in step 1, the operation unit 30 executes the first rotating operation (S21) on the quantum bit of the b-th row and the quantum bit of the d-th row.

Subsequently, in step 2, the operation unit 30 executes the interaction operation (S22) on the pair of the quantum bit of the b-th row and the quantum bit of the c-th row. At the same time, in step 2, the operation unit 30 executes the interaction operation (S22) on the pair of the quantum bit of the c-th row and the quantum bit of the d-th row.

Subsequently, in step 3, the operation unit 30 executes the second rotating operation (S23) on the quantum bit of the b-th row and the quantum bit of the d-th row. At the same time, in step 3, the operation unit 30 executes the first rotating operation (S21) on the quantum bit of the a-th row and the quantum bit of the e-th row.

Subsequently, in step 4, the operation unit 30 executes the interaction operation (S22) on the pair of the quantum bit of the a-th row and the quantum bit of the b-th row. At the same time, in step 4, the operation unit 30 execute interaction operation (S22) on the pair of the quantum bit of the d-th row and the quantum bit of the e-th row.

Subsequently, in step 5, the operation unit 30 executes the second rotating operation (S23) on the quantum bit of the a-th row and the quantum bit of the e-th row.

The effective Hamiltonian also becomes the same as that in FIG. 22 in a case where the operation unit 30 executes the processes in the procedure illustrated in FIG. 24. Therefore, in a case where the converting process is executed by using the initial Hamiltonian illustrated in FIG. 23, the operation unit 30 can execute the converting process with a smaller number of steps than in the case of using the initial Hamiltonian illustrated in FIG. 20.

Fifth Embodiment

A quantum annealing apparatus 10 according to a fifth embodiment deforms initial Hamiltonian including interaction of two quantum bits to effective Hamiltonian including interaction of three quantum bits and executes quantum calculation.

FIG. 25 is a diagram illustrating the initial Hamiltonian of three selected quantum bits and the effective Hamiltonian after the operations in the fifth embodiment.

During the calculation by the quantum calculation unit 20, the operation unit 30 selects a set including a first quantum bit 41, a second quantum bit 42, and a third quantum bit 43 among a plurality of quantum bits included in the quantum calculation unit 20.

The second quantum bit 42 and the third quantum bit 43 are coupled with a strength set according to the initial Hamiltonian.

The first quantum bit 41 is not coupled with the second quantum bit 42 and the third quantum bit 43. However, the first quantum bit 41 is connected to the second quantum bit 42 via, for example, a control quantum bit, and thus, the interaction with the second quantum bit 42 can be adjusted according to an operation from the outside.

The operation unit 30 applies a pulse or the like from the outside to the selected first quantum bit 41, second quantum bit 42, and third quantum bit 43 and executes an operation according to the operation Hamiltonian $H_{OP}$. As a result, the operation unit 30 can cause the selected first quantum bit 41, second quantum bit 42, and third quantum bit 43 to interact with each other according to the effective Hamiltonian expressed by $H_{eff}=Z_1Z_2Z_3$.

As described above, the quantum annealing apparatus 10 according to the fifth embodiment converts the initial Hamiltonian including the interaction of two quantum bits to effective Hamiltonian including the interaction of three quantum bits.

Figure 26:
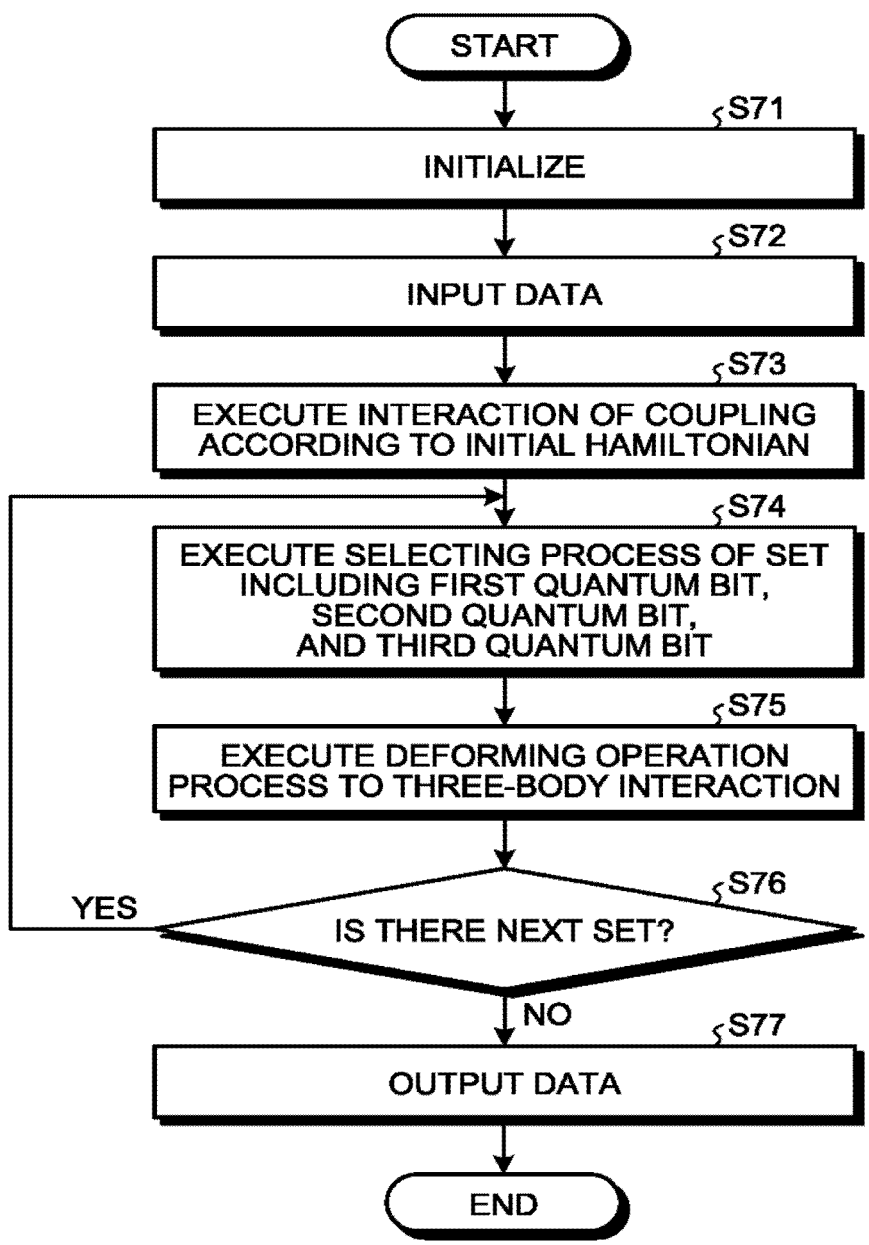
FIG. 26 is a diagram illustrating a flow of processes of the quantum annealing apparatus according to the fifth embodiment.

FIG. 26 is a flowchart illustrating a flow of processes of the quantum annealing apparatus 10 according to the fifth embodiment. The quantum annealing apparatus 10 according to the fifth embodiment executes processes in the flow illustrated in FIG. 26.

First, in S71, the operation unit 30 initializes all of the plurality of quantum bits included in the quantum calculation unit 20. Subsequently, in S72, the input unit 24 receives data from the outside and sets states of the plurality of quantum bits included in the quantum calculation unit 20 according to the received data. Subsequently, in S73, the quantum calculation unit 20 causes the interaction according to a preset initial Hamiltonian to function for the plurality of quantum bits.

Subsequently, in S74, the operation unit 30 selects three quantum bits to be subject to three-body interaction among the plurality of quantum bits included in the quantum calculation unit 20 according to the operation Hamiltonian received from the outside. That is, the quantum calculation unit 20 selects a set including three quantum bits (the first quantum bit 41, the second quantum bit 42, and the third quantum bit 43) having the relationship of FIG. 25.

Subsequently, in S75, the operation unit 30 executes a deforming operation to three-body interaction on the selected set. Details of the deforming operation will be further described with reference to FIG. 27.

Subsequently, in S76, the operation unit 30 determines whether or not there is a next set requiring a deforming operation among the plurality of quantum bits included in the quantum calculation unit 20. If there is a next set (Yes in S76), the operation unit 30 returns the processing to S74 and selects the next set. If there is no next set (No in S76), the operation unit 30 advances the processing to S77.

In S77, the output unit 32 acquires the Z-axis components from each of the plurality of quantum bits included in the quantum calculation unit 20. Then, the output unit 32 binarizes each of the acquired Z-axis components of the plurality of quantum bits to −1 or +1 and outputs the result.

The quantum annealing apparatus 10 according to the fifth embodiment ends this flow when the process of S77 is completed.

Figure 27:
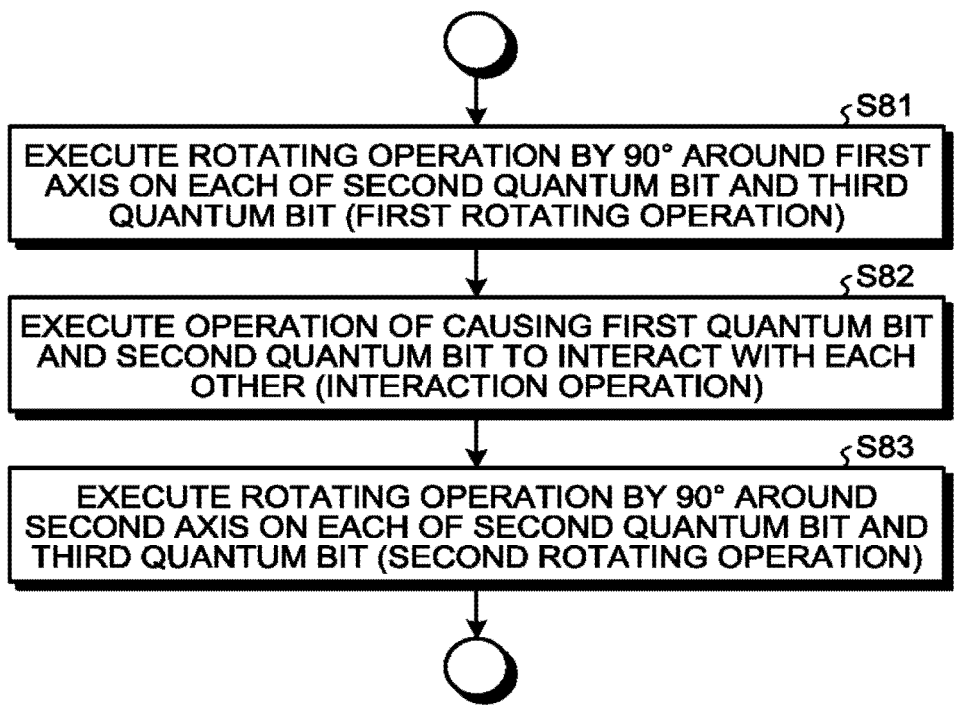
FIG. 27 is a diagram illustrating contents of a deforming operation to three-body interaction of S75 by the operation unit.

FIG. 27 is a diagram illustrating contents of the deforming operation to the three-body interaction in S75 by the operation unit 30.

The operation unit 30 executes a first rotating operation (S81), an interaction operation (S82), and a second rotating operation (S83) as a deforming operation to the three-body interaction in S75.

In the first rotating operation (S81) of S81, the operation unit 30 performs a rotating operation of 90° around the first axis with respect to each of the second quantum bit 42 and the third quantum bit 43.

By executing the first rotating operation (S81), the Z-axis components of the second quantum bit 42 and the third quantum bit 43 become the second-axis components. For example, in the first rotating operation (S81), in a case where the operation unit 30 performs a rotating operation of 90° around the X axis, the axis components of the second quantum bit 42 and the third quantum bit 43 become the Y-axis components. In addition, for example, in the first rotating operation (S81), in a case where the operation unit 30 performs a rotating operation of 90° around the Y axis, the Z-axis components of the second quantum bit 42 and the third quantum bit 43 become the X-axis components.

In the interaction operation (S82), the operation unit 30 controls the control quantum bits and the like between the first quantum bit 41 and the second quantum bit 42 and causes the first quantum bit 41 and the second quantum bit 42 to interact with each other.

Herein, it is assumed that the interaction parameter between the first quantum bit 41 and the second quantum bit 42 is $J_{12}$. In this case, the operation unit 30 causes the first quantum bit 41 and the second quantum bit 42 to interact with each other for a time of $\tau_{OP}$ ($=\pi/4J_{12}$). As a result, the operation unit 30 can convert the interaction between the first quantum bit 41 and the second quantum bit 42 so as to satisfy the relational formulas expressed in the above-described Formulas (15) or (19).

In the second rotating operation (S83), the operation unit 30 performs rotating operation of 90° around the second axis with respect to each of the second quantum bit 42 and the third quantum bit 43.

By executing the second rotating operation (S83), the first-axis components of the second quantum bit 42 and the third quantum bit 43 become the Z-axis components. In addition, for example, in the second rotating operation (S83), in a case where the operation unit 30 performs a rotating operation of 90° around the Y axis, the X-axis components of the second quantum bit 42 and the third quantum bit 43 become the Z-axis components. For example, in the second rotating operation (S83), in a case where the operation unit 30 performs a rotating operation of 90° around the X axis, the Y-axis components of the second quantum bit 42 and the third quantum bit 43 become the Z-axis components.

As described above, the quantum annealing apparatus 10 according to the fifth embodiment deforms the initial Hamiltonian including the interaction of two quantum bits to effective Hamiltonian including the interaction of three quantum bits and performs quantum calculation. Therefore, according to the quantum annealing apparatus 10, it is possible to easily execute optimization calculation using various Hamiltonian.

Sixth Embodiment

A quantum annealing apparatus 10 according to a sixth embodiment effectively converts interaction ($Z_2 Z_3$) of two quantum bits among a plurality of quantum bits arranged in a portion of a matrix to interaction ($Z_1 Z_2 Z_3$) of three quantum bits.

Figure 28:
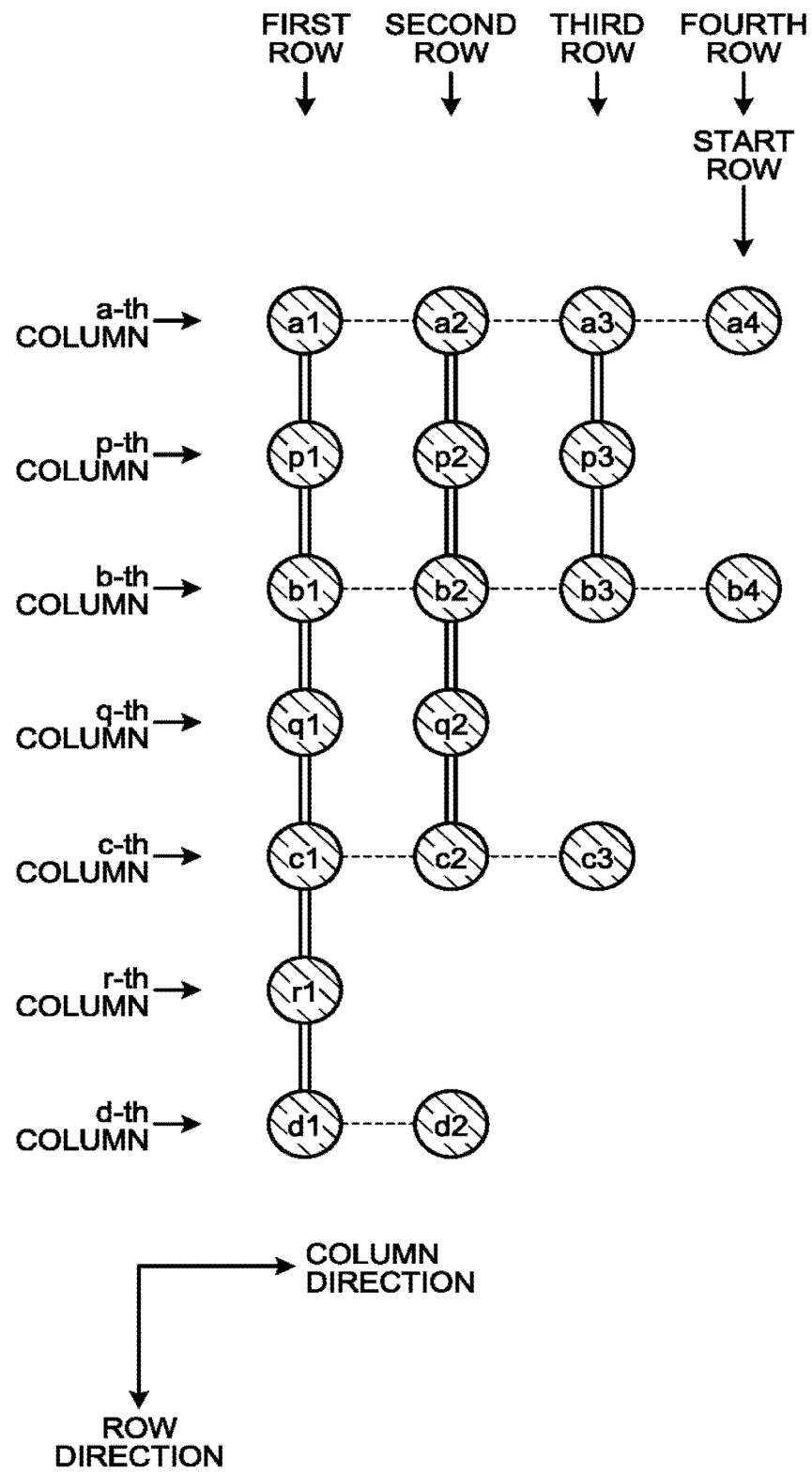
FIG. 28 is a diagram illustrating Hamiltonian of a plurality of quantum bits of a sixth embodiment.

FIG. 28 is a diagram illustrating a plurality of quantum bits included in a quantum calculation unit 20 of the quantum annealing apparatus 10 according to the sixth embodiment.

For example, as illustrated in FIG. 28, the quantum calculation unit 20 of the quantum annealing apparatus 10 according to the sixth embodiment includes a plurality of quantum bits arranged in a partial area of the matrix.

The matrix of FIG. 28 includes a first row, a second row, a third row, and a fourth row. In addition, the matrix of FIG. 28 includes an a-th column, a p-th column, a b-th column, a q-th column, a c-th column, an r-th column, and a d-th column.

In addition, in the example of FIG. 28, the plurality of quantum bits are arranged in the order of the first row to the fourth row in the a-th column, the first row to the third row in the p-th column, the first row to the fourth row in the b-th column, the first row to the second row in the q-th column, the first row to the third row in the c-th column, the first row in the r-th column, and the first row to the second row in the d-th column.

In addition, in the quantum calculation unit 20, two adjacent quantum bits in the first row are coupled with each other. In addition, in the quantum calculation unit 20, two adjacent quantum bits from the a-th column to the c-th column in the second row are coupled with each other. In addition, in the quantum calculation unit 20, two adjacent quantum bits from the a-th column to the b-th column in the third row are coupled with each other.

In addition, in the example illustrated in FIG. 28, the fourth row is set as the start row.

In addition, the quantum calculation unit 20 further includes, for example, a plurality of control quantum bits capable of controlling the interaction of two quantum bits adjacent in the column direction to the a-th column, the b-th column, the c-th column, and the d-th column Including.

FIGS. 29 and 30 are diagrams illustrating an example of operations by an operation unit 30 according to the sixth embodiment. In addition, FIG. 30 is a view continuing from FIG. 29.

The operation unit 30 executes the processing in the procedure according to the flowchart illustrated in FIG. 15 on the plurality of quantum bits illustrated in FIG. 28. In addition, the operation unit 30 executes the converting operation process to the three-body interaction illustrated in FIG. 27 with respect to the process of S53. In addition, with respect to the in-parallel executable processes, the operation unit 30 executes the processes in parallel as much as possible. In such a case, the operation unit 30 executes the operations in the procedure illustrated in, for example, FIGS. 29 and 30.

At start, Hamiltonian ($H_{tgt}$) is as follows.

$$H_{tgt} = Z_{a1}Z_{p1} + Z_{a2}Z_{p2} + Z_{a3}Z_{p3} + Z_{b1}Z_{p1} + Z_{b2}Z_{p2} +$$
$$Z_{b3}Z_{p3} + Z_{b1}Z_{q1} + Z_{b2}Z_{q2} + Z_{c1}Z_{q1} + Z_{c2}Z_{q2} + Z_{c1}Z_{r1} + Z_{d1}Z_{r1}$$

First, in step 1, the operation unit 30 executes a first rotating operation (S61) on the quantum bit of the third row.

Subsequently, in step 2, the operation unit 30 executes an interaction operation (S82) on the pair of the quantum bit of the third row and the quantum bit of the fourth row.

Subsequently, in step 3, the operation unit 30 executes the first rotating operation (S81) on the quantum bits of the second row.

Subsequently, in step 4, the operation unit 30 executes a second rotating operation (S83) on the quantum bits of the third row. Furthermore, in step 4, the operation unit 30 also executes the interaction operation (S82) on the pair of the quantum bit of the second row and the quantum bit of the third row in parallel.

Subsequently, in step 5, the operation unit 30 executes the first rotating operation (S81) on the quantum bits of the first row.

Subsequently, in step 6, the operation unit 30 executes the second rotating operation (S83) on the quantum bits of the second row. In addition, in step 6, the operation unit 30 also executes the interaction operation (S82) on the pair of the quantum bit of the first row and the quantum bit of the second row in parallel.

Finally, in step 7, the operation unit 30 executes the second rotating operation (S83) on the quantum bit of the first row.

FIG. 31 is a diagram illustrating effective Hamiltonian after the initial Hamiltonian illustrated in FIG. 28 is converted by the procedure illustrated in FIGS. 29 and 30.

In a case where the operation unit 30 executes the processing according to the procedure illustrated in FIGS. 29 and 30, the effective Hamiltonian is as illustrated in FIG. 31.

The effective Hamiltonian illustrated in FIG. 31 is expressed as follows.

$$H_{tgt} = Z_{a1}Z_{a2}Z_{p1} + Z_{a2}Z_{a3}Z_{p2} + Z_{a3}Z_{a4}Z_{p3} +$$
$$Z_{b1}Z_{b2}Z_{p1} + Z_{b2}Z_{b3}Z_{p2} + Z_{b3}Z_{b4}Z_{p3} + Z_{b1}Z_{b2}Z_{q1} +$$
$$Z_{b2}Z_{b3}Z_{q2} + Z_{c1}Z_{c2}Z_{q1} + Z_{c2}Z_{c3}Z_{q2} + Z_{c1}Z_{c2}Z_{r1} + Z_{d1}Z_{D2}Z_{r1}$$

As described above, according to the quantum annealing apparatus 10 according to the sixth embodiment, it is possible to effectively convert the interaction ($Z_2Z_3$) of two quantum bits to the interaction ($Z_1Z_2Z_3$) of three quantum bits with respect to a plurality of quantum bits arranged in a portion of the matrix. Furthermore, according to the quantum annealing apparatus 10 according the sixth embodiment, it is possible to simultaneously execute the deforming operation process on a plurality of sets.

Seventh Embodiment

A quantum calculation unit 20 of a quantum annealing apparatus 10 according to a seventh embodiment is realized by a semiconductor device including cells including floating gate structures.

Figure 32:
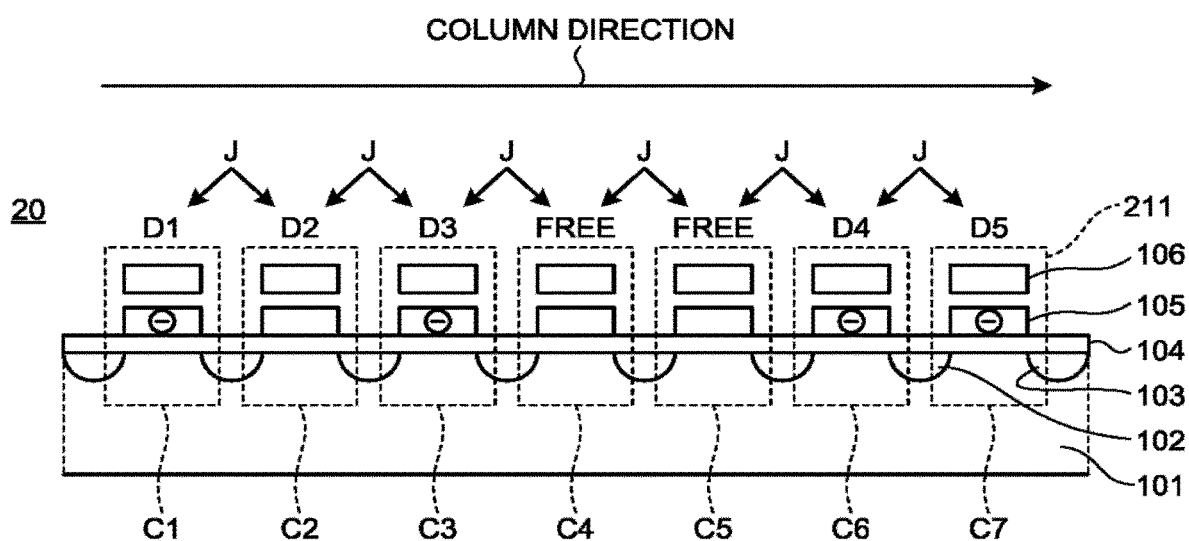
FIG. 32 is a diagram illustrating a structure of a quantum calculation unit according to a seventh embodiment.

FIG. 32 is a diagram illustrating a structure of the quantum calculation unit 20 according to the seventh embodiment. In this embodiment, the quantum calculation unit 20 includes a plurality of memory cells 211 realised by semiconductor devices. Each of the plurality of memory cells 211 functions as a quantum bit. For example, in FIG. 32, memory cells C1 to C7 arranged in the column direction of the same bit line are illustrated.

The plurality of memory cells 211 are formed on the semiconductor substrate 101. The memory cell 211 includes a tunneling film 104 (also referred to as a tunnel oxide film or a gate insulating film), two diffusion regions 102 and 103, a floating gate 105, and a control gate 106.

The semiconductor substrate 101 is, for example, a silicon substrate or the like. The tunneling film 104 is formed on the upper surface of the semiconductor substrate 101 and is an insulating film. The tunneling film 104 functions as a potential barrier.

The diffusion regions 102 and 103 are, for example, regions in which dopants are diffused to the semiconductor substrate 101. The diffusion regions 102 and 103 function as a source and a drain in the memory cell 211.

The floating gate 105 is a charge retention layer that retains charges that have entered from the semiconductor substrate 101 via the tunneling film 104. The control gate 106 is a gate electrode to which a voltage for controlling the threshold voltage and the tunnel effect of each memory cell 211 is applied. Each memory cell 211 can have a structure similar to that of a cell in an existing NAND type flash memory.

The number of charges retained in the floating gate 105 of the memory cell 211 indicates the state of the quantum bit. Herein, the charge refers to an electron or a hole. Therefore, the data of '0' and the data of '1' correspond to the state where the number of charges of the memory cell 211 is N (N is an integer of 1 or more) or N+1 or N or N−1 (N>1). The current flowing through the region (channel region) below the floating gate 105 in the semiconductor substrate 101 varies with the number of charges retained in the floating gate 105. Therefore, the number of charges retained in the floating gate 105 can be detected by measuring the current flowing between the diffusion regions 102 and 103 (source/drain).

In addition, in a case where the quantum bit array is configured with the same layout as a memory cell array in an existing NAND flash memory as in this embodiment, the fine floating gates 105 are provided in the vicinity. Therefore, interference between the memory cells based on the Coulomb interaction corresponding to the distance works between the plurality of memory cells 211 adjacent to or close to each other in the upper, lower, left, right, and oblique directions. The quantum calculation unit 20 according to this embodiment uses this memory cell interference effect as an interaction between quantum bits.

The plurality of memory cells 211 store data describing an optimization problem to be solved. In a case where tunneling due to quantum fluctuation is generated for each of the memory cells 211 in which data is stored, the quantum calculation unit 20 moves the charges retained in the floating gate 105 of each of the memory cells 211 so that the arrangement of data is minimized in terms of energy. For example, the quantum calculation unit 20 generates tunneling between the semiconductor substrate 101 and the floating gate 105 for a certain period of time. After that, the quantum calculation unit 20 blocks the tunneling between the semiconductor substrate 101 and the floating gate 105. As a result, the quantum calculation unit 20 can realize the processes of quantum annealing.

Figure 33:
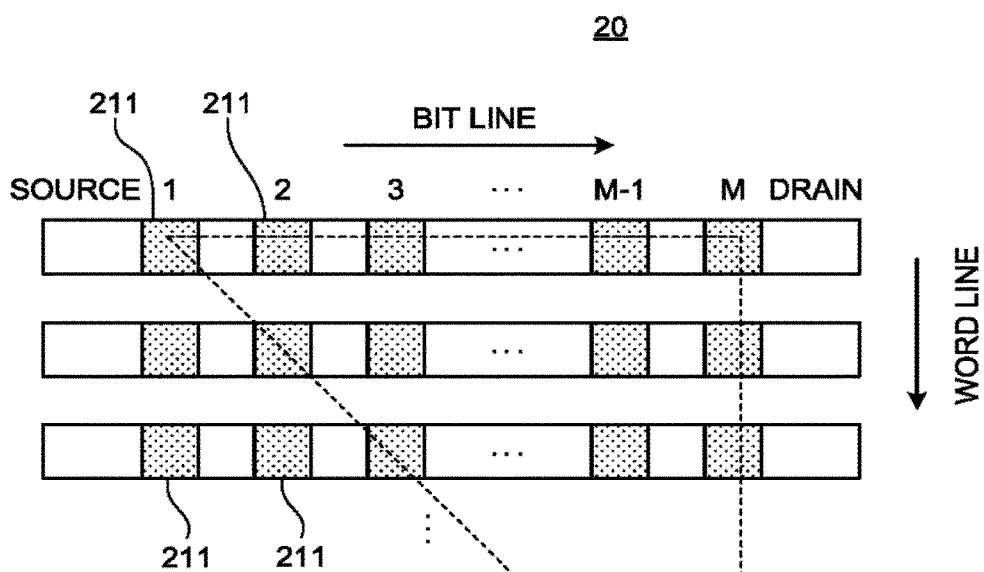
FIG. 33 is a diagram illustrating an arrangement of memory cells included in the quantum calculation unit according to the seventh embodiment.

FIG. 33 is a diagram illustrating the arrangement of the memory cells 211 included in the quantum calculation unit 20 according to the seventh embodiment. The quantum calculation unit 20 includes a plurality of bit lines arranged in parallel. The plurality of memory cells 211 are formed at equal intervals on the respective bit lines. In addition, the plurality of memory cells 211 are arranged side by side along a word line perpendicular to the bit lines. That is, the quantum calculation unit 20 is arranged in a two-dimensional matrix shape on the semiconductor substrate 101.

Therefore, in the quantum calculation unit 20 according to the seventh embodiment, it is possible to easily realize the arrangement of the quantum bits in a matrix shape (or a portion of the matrix) as illustrated in, for example, FIGS. 8, 14, 20, 23, and 28.

In addition, for example, in the quantum calculation unit 20, a plurality of quantum bits arranged in a substantially triangular shape as illustrated in, for example, FIGS. 20 and 23 can be arranged in a triangular region indicated by, for example, a dotted line in FIG. 33. Accordingly, in such a quantum calculation unit 20, it is possible to realize two initial Hamiltonian that couple a plurality of quantum bits arranged in a substantially triangular range by using a plurality of memory cells 211 arranged in a rectangular shape.

Eighth Embodiment

Figure 34:
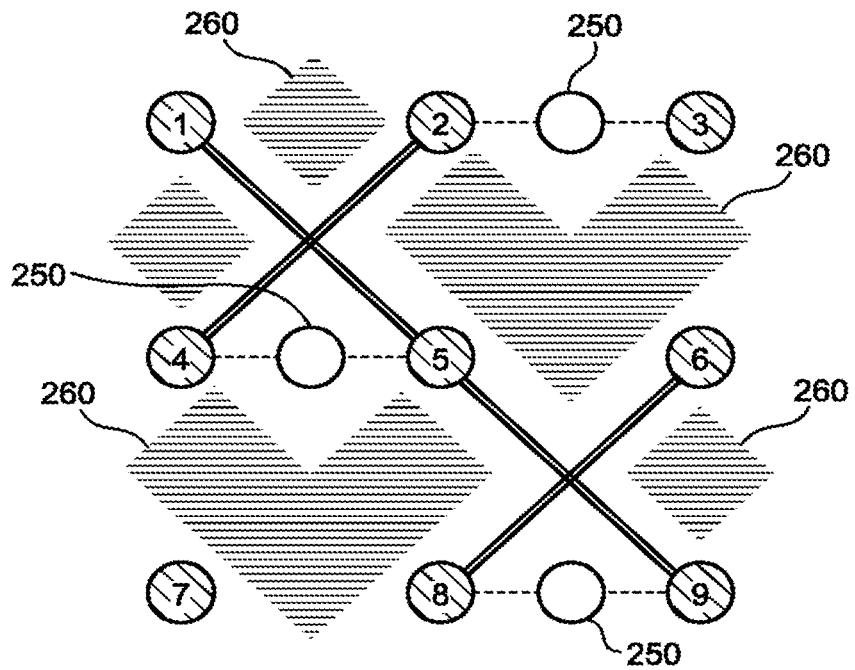
FIG. 34 is a diagram illustrating an example of a structure of a portion of a quantum calculation unit according to an eighth embodiment.

FIG. 34 is a diagram illustrating an example of a structure of a portion of a quantum calculation unit 20 according to an eighth embodiment. The quantum calculation unit 20 of the quantum annealing apparatus 10 according to the eighth embodiment includes one or more control quantum bits 250 and an air gap 260.

The control quantum bit 250 is connected between two quantum bits that interact with each other by an operation of applying a pulse or the like from the outside. For example, a voltage larger than the quantum bit is applied to the control quantum bit 250, and thus, the interaction of the two connected quantum bits is turned on or off. The control quantum bit 250 is realized by the method described in, for example, Antti O. Niskanen, Yasunobu Nakamura, and Jaw-Shen Tsai, "Tunable coupling scheme for flux quantum bits at the optimal point", Phys. Rev. B 73, 094506, (2006).

In addition, the air gap 260 is provided between two adjacent quantum bits which are not coupled and which are not made to interact by an operation from the outside. The air gap 260 inhibits the transmission of the coupling force between the quantum bit and the quantum bit. For example, in a case where the quantum bit and the quantum bit are coupled by Coulomb interaction, the air gap blocks the transmission of Coulomb force. In addition, the quantum calculation unit 20 may be a low dielectric constant portion made of a low dielectric constant material instead of the air gap.

Figure 35:
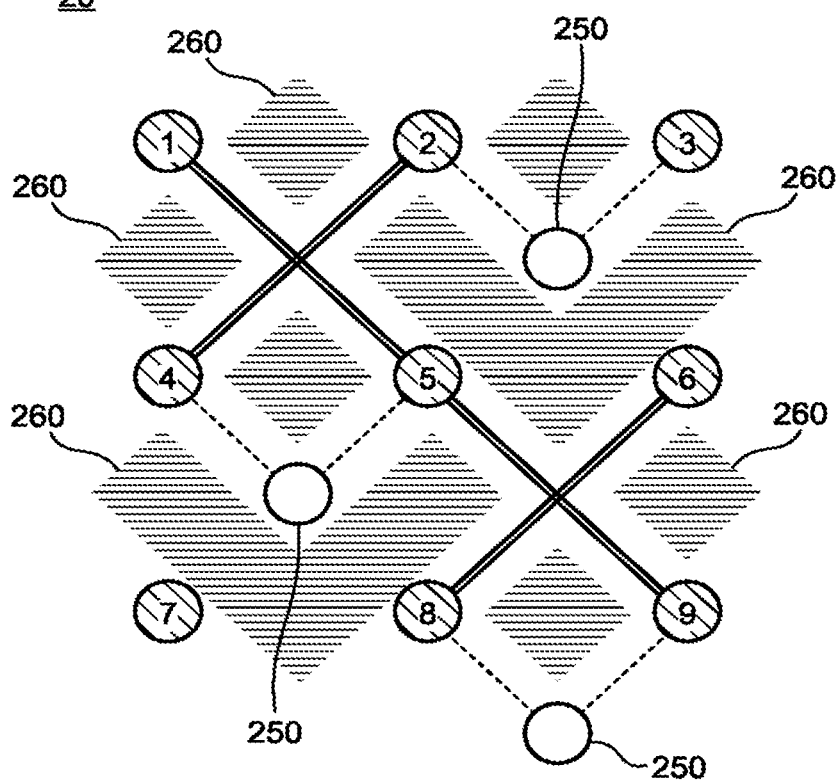
FIG. 35 is a diagram illustrating another example of the structure of the quantum calculation unit according to the eighth embodiment.

FIG. 35 is a diagram illustrating another example of the structure of the quantum calculation unit 20 according to the eighth embodiment. Each of the plurality of quantum bits and the plurality of control quantum bits 250 may be arranged at the intersection point of the lattice. In such a quantum calculation unit 20, the quantum bit and the quantum bit can be coupled with each other in a straight line. In addition, in the quantum calculation unit 20, the quantum bit and the control quantum bit can be coupled with each other in a straight line. As a result, the quantum calculation unit 20 can accurately adjust the coupling force and allow the manufacturing to be easy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quantum annealing apparatus comprising:
   a quantum calculation unit including a plurality of quantum bits coupled according to initial Hamiltonian;
   an input unit applying data to the plurality of quantum bits;
   an operation unit operating the plurality of quantum bits; and
   an output unit acquiring and outputting components in a Z axis from the plurality of quantum bits, wherein
   the operation unit executes:
   a selecting process of selecting a first quantum bit, a second quantum bit and a third quantum bit among the plurality of quantum bits, the second quantum bit and the third quantum bit being coupled in the quantum calculation unit;
   a first rotating operation of rotating each of the second quantum bit and the third quantum bit by 90° around a first axis perpendicular to the Z axis;
   an interaction operation of causing the first quantum bit and the second quantum bit to interact with each other; and
   a second rotating operation of rotating each of the second quantum bit and the third quantum bit by 90° around a second axis perpendicular to the Z axis and the first axis.

2. The apparatus according to claim 1, wherein, in the quantum calculation unit, the first quantum bit and the second quantum bit are not coupled with each other.

3. The apparatus according to claim 1, wherein when a strength of coupling between the first quantum bit and the second quantum bit is J, in the interaction operation, the operation unit causes the first quantum bit and the second quantum bit to interact with each other for $\pi/(4 \times J)$.

4. The apparatus according to claim 1, wherein
   the operation unit further:
   selects a fourth quantum bit among the plurality of quantum bits in the selecting process; and
   causes the third quantum bit and the fourth quantum bit to interact with each other in the interaction operation.

5. The apparatus according to claim 4, wherein, in the quantum calculation unit, the fourth quantum bit and the third quantum bit are not coupled with each other.

6. The apparatus according to claim 4, wherein when a strength of coupling between the third quantum bit and the fourth quantum bit is J, in the interaction operation, the operation unit causes the third quantum bit and the fourth quantum bit to interact with each other for $\pi/(4 \times J)$.

7. The apparatus according to claim 4, wherein
   the plurality of quantum bits are arranged in a matrix shape,
   in the quantum calculation unit,
      two adjacent quantum bits in a column direction are not coupled with each other,
      quantum bits arranged in a predetermined start row are not coupled with other quantum bits, and
      two adjacent quantum bits in a row direction arranged in a row excluding the start row are coupled with each other, and
   the operation unit selects, as target rows, adjacent rows sequentially in order from a row adjacent to the start row, and each time the target row is selected, the operation unit executes the selecting process, the first rotating operation, the interaction operation, and the second rotating operation.

8. The apparatus according to claim 7, wherein the operation unit sets, as a target row, a row adjacent to the start row at a first time, and selects, as a new target row, a row adjacent to the target row immediately before and not selected as the target row so far after a second time.

9. The apparatus according to claim 8, wherein
   in the selecting process, one or more sets each including the first quantum bit, the second quantum bit, the third quantum bit, and the fourth quantum bit are selected, and
   each of the one or more sets:
      includes, as the second quantum bit and the third quantum bit, two quantum bits included in the target row and coupled in the row direction;
      includes, as the first quantum bit, a quantum bit included in the target row selected immediately before and adjacent to the second quantum bit in the column direction; and
      includes, as the fourth quantum bit, a quantum bit included in the target row selected immediately before and adjacent to the third quantum bit in the column direction.

10. The apparatus according to claim 9, wherein, in a case where the plurality of sets are selected for one target row, the operation unit simultaneously executes the first rotating operation on the selected plurality of set, simultaneously executes the interaction operation on the selected plurality of sets, and simultaneously executes the second rotating operation on the selected plurality of sets.

11. The apparatus according to claim 7, wherein the plurality of quantum bits are arranged in a range of a portion of the matrix.

12. The apparatus according to claim 7, wherein
the quantum calculation unit further includes a plurality of control quantum bits for each controlling a strength of coupling between two quantum bits among the plurality of quantum bits, and
in the interaction operation, the operation unit operates a control quantum bit for controlling a strength of coupling between the first quantum bit and the second quantum bit and a control quantum bit for controlling a strength of coupling between the third quantum bit and the fourth quantum bit among the plurality of control quantum bits.

13. The apparatus according to claim 1, wherein the quantum calculation unit includes, as the plurality of quantum bits, a plurality of memory cells each coupled to another memory cell by Coulomb interaction based on capacitance junction.

14. The apparatus according to claim 13, wherein each of the plurality of memory cells includes a floating gate structure.

15. The apparatus according to claim 13, wherein the quantum calculation unit further includes an air gap or a low dielectric constant portion provided between two adjacent quantum bits, which are not coupled with each other and are not made to interact by an operation from an outside.

* * * * *